(12) United States Patent
Sasanka

(10) Patent No.: US 10,152,421 B2
(45) Date of Patent: Dec. 11, 2018

(54) INSTRUCTION AND LOGIC FOR CACHE CONTROL OPERATIONS

(71) Applicant: Intel Corporation, Santa Clara, CA (US)

(72) Inventor: Ruchira Sasanka, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 65 days.

(21) Appl. No.: 14/948,830

(22) Filed: Nov. 23, 2015

(65) Prior Publication Data

US 2017/0147496 A1    May 25, 2017

(51) Int. Cl.
| | |
|---|---|
| *G06F 12/08* | (2016.01) |
| *G06F 12/0875* | (2016.01) |
| *G06F 12/0811* | (2016.01) |
| *G06F 12/0815* | (2016.01) |
| *G06F 12/0888* | (2016.01) |

(52) U.S. Cl.
CPC ...... *G06F 12/0875* (2013.01); *G06F 12/0811* (2013.01); *G06F 12/0815* (2013.01); *G06F 12/0888* (2013.01); *G06F 2212/1021* (2013.01); *G06F 2212/621* (2013.01)

(58) Field of Classification Search
CPC ............ G06F 12/0875; G06F 12/0811; G06F 12/0815; G06F 2212/621
See application file for complete search history.

(56) References Cited

U.S. PATENT DOCUMENTS

| | | | |
|---|---|---|---|
| 5,835,929 A | | 11/1998 | Gaskins et al. |
| 7,934,054 B1 | * | 4/2011 | Moll ............... G06F 1/3203 |
| | | | 345/541 |
| 9,069,690 B2 | * | 6/2015 | Hildesheim ...... G06F 12/1027 |
| 9,086,973 B2 | * | 7/2015 | Vorbach ............... G06F 9/526 |
| 9,356,602 B1 | * | 5/2016 | Bielich et al. ..... H03K 19/1776 |
| 2005/0044325 A1 | | 2/2005 | Rowlands et al. |
| 2012/0137075 A1 | * | 5/2012 | Vorbach ............... G06F 9/526 |
| | | | 711/122 |
| 2013/0138894 A1 | | 5/2013 | Loh et al. |
| 2014/0052992 A1 | | 2/2014 | Moyer et al. |
| 2014/0304475 A1 | | 10/2014 | Ramanujan et al. |
| 2015/0046648 A1 | | 2/2015 | Anderson et al. |

OTHER PUBLICATIONS

Webopedia, "Multi-Core Technology", Feb. 28, 2008, pp. 1-2, https://web.archive.org/web/20080228000102/http://www.webopedia.com/TERM/M/multi_core_technology.html.*
Anonymous, "Multi-Core Processor", Nov. 1, 2010, pp. 1-4, https://web.archive.org/web/20101101140435/http://searchdatacenter.techtarget.com/definition/multi-core-processor.*
UTEP, "Instruction Set Architecture", Oct. 10, 2015, pp. 1-60, https://web.archive.org/web/20151010073605/http://www.ece.utep.edu/courses/web3376/Notes_files/ee3376-isa.pdf.*

(Continued)

*Primary Examiner* — Christopher D Birkhimer
(74) *Attorney, Agent, or Firm* — Trop, Pruner & Hu, P.C.

(57) ABSTRACT

In one embodiment, a processor includes: a fetch logic to fetch instructions; a decode logic to decode the instructions; a cache memory; and a control logic to receive a cache filter instruction and responsive to the cache filter instruction enable only a selected portion of a memory address space to be eligible to be cached in the cache memory. The cache filter instruction may indicate the selected portion of the memory address space. Other embodiments are described and claimed.

17 Claims, 28 Drawing Sheets

(56) References Cited

OTHER PUBLICATIONS

Microsoft, "Computer Dictionary", Fifth Edition, 2002, p. 276.*
Anonymous,"Instruction Set Architectures (ISA)", Oct. 16, 2015, pp. 1-3, https://web.archive.org/web/20151016202153/http://www.cs.kent.edu/~durand/CS0/Notes/Chapter05/isa.html.*
Anonymous, "Instruction Set", Oct. 3, 2012, pp. 1, https://web.archive.org/web/20121003004713/https://www.computerhope.com/jargon/i/instset.htm.*
Allan Snavely, "Instruction Set Architecture", Jun. 12, 2004, pp. 1-39, https://web.archive.org/web/20040612184854/http://www.sdsc.edu/~allans/cs141/L2.ISA.pdf.*
Jim Handy, "The Cache Memory Book: The Authoritative Reference on Cache Design", Second Edition, pp. 8-23, 210-211, and 220-221 (Year: 1998).*
U.S. Appl. No. 14/541,504, filed Nov. 14, 2014, entitled "Providing Multiple Memory Modes for a Processor Including Internal Memory," by Avinash Sodani, et al.
U.S. Appl. No. 14/697,832, filed Apr. 28, 2015, entitled "Controlling Displacement in a Co-Operative and Adaptive Multiple-Level Memory System," by Kshitij A. Doshi, et al.
U.S. Appl. No. 14/926,336, filed Oct. 29, 2015, entitled "Instruction and Logic to Prefetch Information From a Persistent Memory," by Karthik Kumar, et al.
Intel Corporation, "Stream on Intel® Xeon Phi™ Coprocessors," Oct. 22, 2013, 6 pages.
Intel Developer Zone, "What Public Disclosures Has Intel Made About Knights Landing?," Nov. 25, 2014, 4 pages.
International Searching Authority, "Notification of Transmittal of the International Search Report and the Written Opinion of the International Searching Authority," dated Jan. 12, 2017, in International application No. PCT/US2016/054070.

* cited by examiner

| 127 120 | 119 112 | 111 104 | 103 | | 24 | 23 16 | 15 8 | 7 0 |
|---|---|---|---|---|---|---|---|---|
| sbbb bbbb | sbbb bbbb | sbbb bbbb | ● | ● | ● | sbbb bbbb | sbbb bbbb | sbbb bbbb |

Unsigned Packed Byte Representation 344

| 127 120 | 119 112 | 111 104 | 103 | | 24 | 23 16 | 15 8 | 7 0 |
|---|---|---|---|---|---|---|---|---|
| sbbb bbbb | sbbb bbbb | sbbb bbbb | ● | ● | ● | sbbb bbbb | sbbb bbbb | sbbb bbbb |

Signed Packed Byte Representation 345

| 127 112 | 111 | | 16 | 15 0 |
|---|---|---|---|---|
| wwww wwww wwww wwww | ● | ● ● | | wwww wwww wwww wwww |

Unsigned Packed Word Representation 346

| 127 112 | 111 | | 16 | 15 0 |
|---|---|---|---|---|
| swww wwww wwww wwww | ● | ● ● | | swww wwww wwww wwww |

Signed Packed Word Representation 347

| 127 92 | 91 32 | 31 0 |
|---|---|---|
| dddd dddd dddd dddd dddd dddd dddd dddd | ● ● ● | dddd dddd dddd dddd dddd dddd dddd dddd |

Unsigned Packed Doubleword Representation 348

| 127 92 | 91 32 | 31 0 |
|---|---|---|
| sddd dddd dddd dddd dddd dddd dddd dddd | ● ● ● | sddd dddd dddd dddd dddd dddd dddd dddd |

Signed Packed Doubleword Representation 349

FIG. 3C

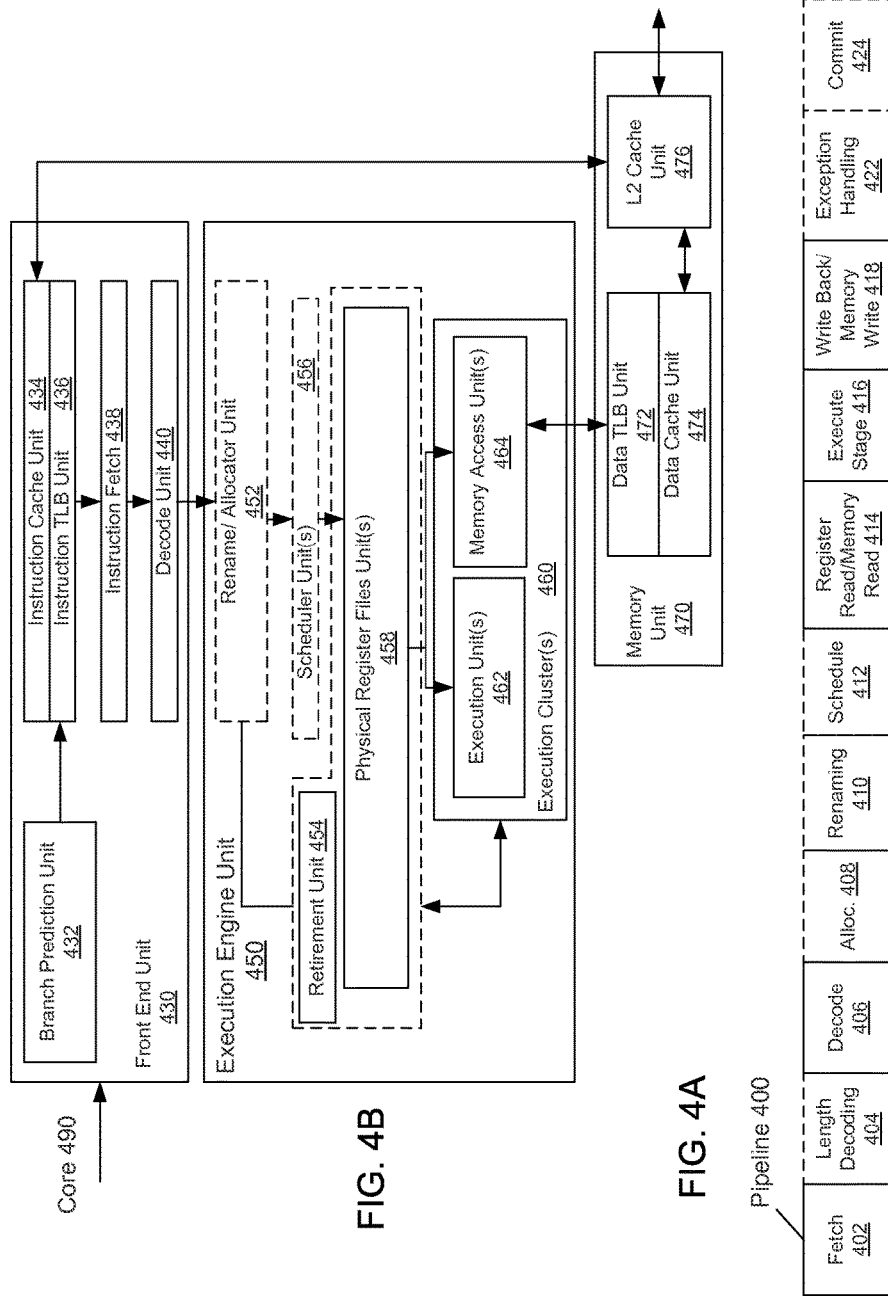

US 10,152,421 B2

INSTRUCTION AND LOGIC FOR CACHE CONTROL OPERATIONS

TECHNICAL FIELD

The present disclosure pertains to the field of processing logic, microprocessors, and associated instruction set architecture that, when executed by the processor or other processing logic, perform logical, mathematical, or other functional operations.

BACKGROUND

Cache memories are common components in processors and computer systems. Modern processors can include multiple levels of cache memories. Such cache memories are adapted to store information recently used and/or frequently used, such that latency incurred in obtaining the data from further portions of a system storage hierarchy (including a system memory, mass storage or so forth) can be avoided. Depending on a type of workload being executed in a system, cache memory usage may not improve performance. For example, when a working set of an application exceeds a size of the cache memory, any data of the working set stored in the cache memory may have already been evicted by new data before it is reused.

In particular workload situations such as where streaming accesses are prevalent, an outer loop that proceeds through a large number of time steps may not benefit from use of a cache memory, as a streaming data access of one or more internal loops causes data to be evicted prior to its usage in a next iteration of the outer loop, impacting performance.

BRIEF DESCRIPTION OF THE DRAWINGS

FIG. 3C illustrates various signed and unsigned packed data type representations in multimedia registers, in accordance with embodiments of the present disclosure.

FIG. 4A is a block diagram illustrating an in-order pipeline and a register renaming stage, out-of-order issue/execution pipeline, in accordance with embodiments of the present disclosure.

FIG. 4B is a block diagram illustrating an in-order architecture core and a register renaming logic, out-of-order issue/execution logic to be included in a processor, in accordance with embodiments of the present disclosure.

DETAILED DESCRIPTION

Figure 1A:
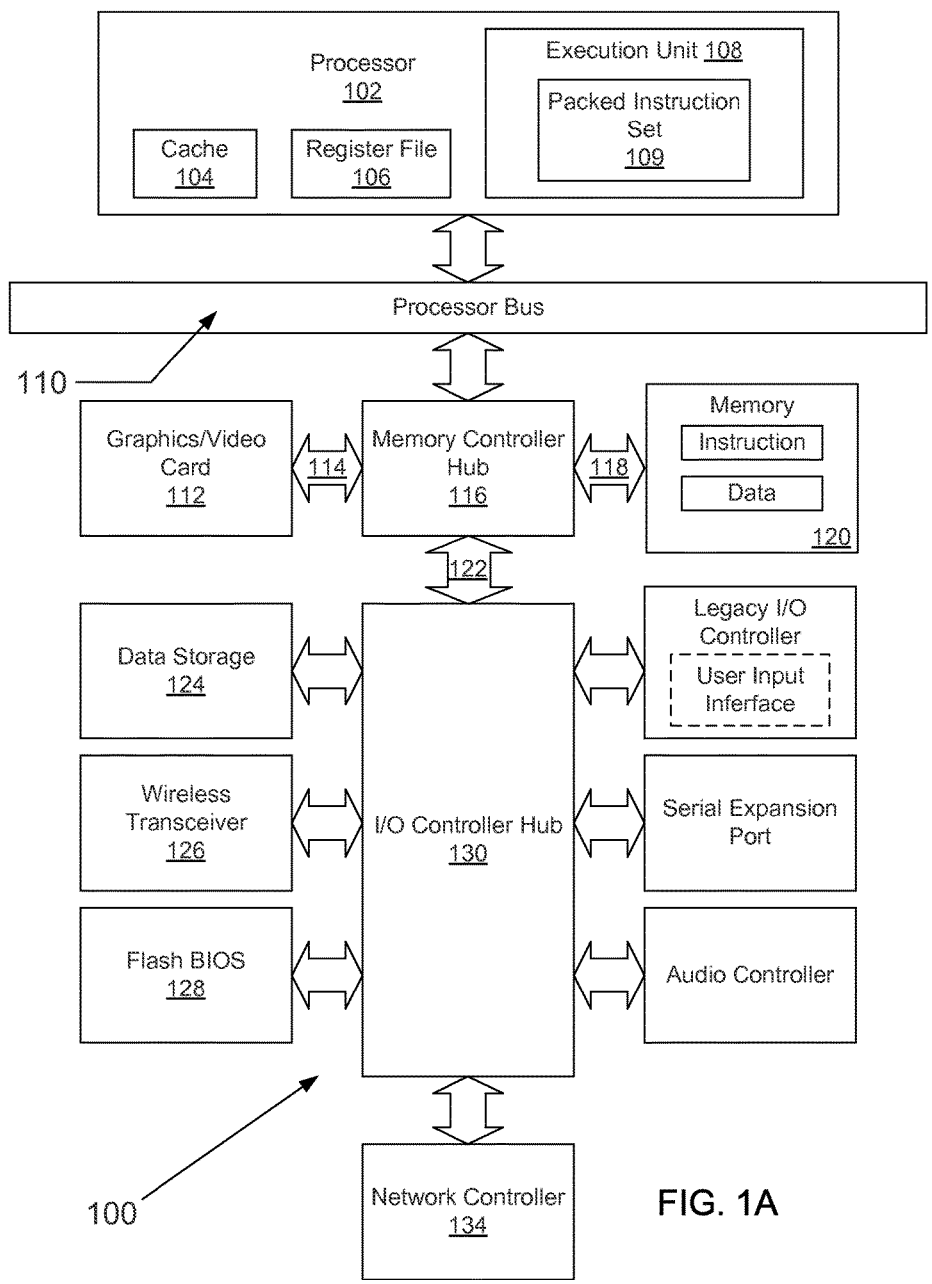
FIG. 1A is a block diagram of an exemplary computer system formed with a processor that may include execution units to execute an instruction, in accordance with embodiments of the present disclosure.

The following description describes an instruction and processing logic for cache filtering operations to be performed by a processor, virtual processor, package, computer system, or other processing apparatus. In the following description, numerous specific details such as processing logic, processor types, micro-architectural conditions, events, enablement mechanisms, and the like are set forth in order to provide a more thorough understanding of embodiments of the present disclosure. It will be appreciated, however, by one skilled in the art that the embodiments may be practiced without such specific details. Additionally, some well-known structures, circuits, and the like have not been shown in detail to avoid unnecessarily obscuring embodiments of the present disclosure.

In various embodiments, instructions of an instruction set architecture (ISA) may be provided to control configuration of one or more cache memories included in or associated with a processor, such that only a limited amount of data is eligible to be stored in the cache memory. More specifically, embodiments provide a filtering technique to enable only particular portions of a memory address space to be cached in a given cache memory. Using such instruction, a cache memory may be configured such that only a subset of a working set (address space) of an application may be cached. The remaining portion of the working set is not stored in the given cache memory, and as such, memory access requests to the non-cached address space are accessed from a further portion of a memory hierarchy, such as a system memory that may be implemented using a dynamic random access memory (DRAM).

Using an embodiment of the present invention, if a cached subset of a working set of a given application is smaller than the size of the cache memory, such subset will persist through an entire execution of the application. In the context of a high performance computing (HPC) application that may run for long periods of time on a given server, such working set may persist to improve performance.

Note that in particular implementations using cache filtering for a high-bandwidth memory-side cache as a software configured cache, ease of programming is realized. That is, using an embodiment a programmer need not explicitly allocate structures in this area of memory, avoiding extensive programmer effort and modifications that would be required for a large number of structures and/or source code. As such, embodiments enable automatic usage of a memory-side cache without any changes to a source program or binary code.

Assume a situation in which a memory-side cache or other cache is not large enough to accommodate a streaming HPC application with a large working set. For instance, assume a 16 GB memory-side cache and computation of the following form shown in Table 1 below.

TABLE 1 for (time_step=0; time_step < NumSteps; time_step++) {
    // stream 40 GB of data (e.g., Stream Triad)
}

Without using an embodiment of the present invention, execution of the code shown in Table 1 results in all misses in a 16 GB memory-side cache. This is the case, since in each time-step, 40 GB of data is streamed into the cache memory, resulting in every streaming access leading to a cache miss. Still further, understand that in a particular platform design, prefetching may not be useful, as further portions of a memory hierarchy such as a system memory implemented with DRAM has a lower bandwidth as compared to that of the memory-side cache.

Note that in Table 1, the outer loop goes through a large number of time-steps. In each time-step, a large amount of data (larger than the size of the memory-side cache) is streamed in. In this case, the memory-side cache is not effective because almost every access would be a cache miss. If a data item X was brought into the cache memory in time-step T, when X is accessed again in the next time-step T+1, it would have been replaced by other data due to the fact that 40 GB of new data will be accessed in the meantime.

Thus in a platform configured according to the above example, execution of a workload as in above Table 1 may result in all misses in this memory-side cache (even with prefetching). Given the parameters of this example platform, at most 40% ($16/40$) of accesses can be served using cache lines from the memory-side cache. Using an embodiment of the present invention in this example to configure one or more cache memories with cache filtering instructions as described herein may lead to a performance improvement of 40%.

Using instructions in accordance with an embodiment, portions of an addressable memory address space that can be allocated in one or more particular cache memories of a system are filtered out. By making some portions of an address space (e.g., cache lines) ineligible for cache allocation, a subset of the working set may be preserved for an entire execution of an application. For instance, for the example given in Table 1, if every fifth cache line were to be enabled for cache memory storage, e.g., by allowing only addresses divisible by 5*64 (assuming a 64B cache-line size), a subset of cache lines may be preserved for the entire execution.

In one embodiment, a cache filter instruction of an ISA may take the form of:

FilterBy BitMask where BitMask is an N-bit (e.g., 8-bit) mask to indicate which bits of an address of a memory access request are to be a predetermined value (e.g., 1) for the memory access request to be considered for caching in a given cache memory level, such as a memory-side cache. If a given memory address has the predetermined value (e.g., 1) in any of those bit positions indicated by the corresponding value stored in the BitMask, it is eligible for caching. Otherwise, the memory address is not eligible for storage in the cache memory level. Note that in some cases, the bit mask can be encoded in an immediate field of the instruction.

While shown above with a particular instruction encoding, understand the scope of the present invention is not limited in this regard and in other embodiments, a variety of different instruction encodings may be used to present a cache filter instruction. Furthermore, as described further below, additional fields may be included in such instruction to provide additional encoding information.

Described below in Tables 2 and 3 are several examples of a cache filter instruction arrangement in which a controllable amount of a memory address space (e.g., a given percentage of the entire addressable memory address space) is to be configured as eligible for allocation in a cache memory.

Table 2 represents address bits for a first cache filter instruction of the form: FilterBy 0x40. Using this instruction having a bit mask value of (100 0000) allows only every other cache line address to be eligible for allocation as shown below:

TABLE 2

| Address Bits | 00000 and ... 00000 | 1 | 00 0000 |
|---|---|---|---|
| Effect | Upper address bits (not filtered by these bits) | Address must have 1 @ this bit position | Byte-within 64B cache-line (ignored) |

In the example of Table 2, the last 6 least-significant bits (LSBs) are ignored because they indicate a position within the cache line. The next LSB is 1, indicating an address is to have this bit set to 1 for it to be considered a candidate for caching in the cache. With the example shown in Table 2, execution of this instruction results in 50% of addresses being eligible for caching.

Table 3 represents address bits for a second cache filter instruction of the form: FilterBy 0xc0. Referring now to Table 3, shown is another example of a cache filter instruction in accordance with an embodiment.

TABLE 3

| Address Bits | 00000 ... 00000 | 11 | 00 0000 |
|---|---|---|---|
| Effect | Upper address bits (not filtered by these bits) | Address must have 10 or 01, or 11 @ these bit positions | Byte-within 64B cache-line (ignored) |

Using this mask (1100 0000) of Table 3 allows every second line (0100 0000), third line (1100 0000) and fourth line (1000 0000) to be considered for caching. This results in 75% of addresses being cached.

Understand that cache filter instructions as described herein may take various forms, and may include optional arguments, in some implementations. For example, in some cases, additional fields may be provided as part of the instruction encoding to enable additional control and configuration of one or more cache memories as described herein.

More particularly in one embodiment, a filter value field may be provided, which in an embodiment may be a 1-bit field to indicate, when set, that the given address bits corresponding to the filter mask are to be a zero value (instead of 1) to be considered for caching. In this or another embodiment, a cache level field may be provided, which in an embodiment may be an M-bit field (e.g., 2-bit field), to indicate the cache level to which this filtering is to be applied (e.g., one or more levels of internal cache memory of a processor, a memory-side cache memory, and/or an external DRAM configured as a cache memory for a two level memory implementation including a large persistent memory storage, as described further herein).

In these or other embodiments, the cache filter instruction may further include a mask size field, which may be an N-bit field (e.g., 3-bit field) to indicate the number of address bits that can be configured for use in determining cache storage eligibility. For instance, in Table 3, it is assumed that 2 bits are configured (shown in the middle column of Table 3). To enable 3 bits to be configured, e.g., to provide a mask of 011, the number of bits can be specified in this mask size field. Note that by providing for 3 bits to be used for mask operations as described herein provides for incrementing in steps of 12.5% (e.g., instead of 25% in Table 3). Alternatively, the number of bits that can be configured can be the property of a given architecture.

Although the scope of the present invention is not limited in this regard, in some cases a cache filter instruction of an ISA may be provided as a ring-0 privileged instruction (for execution by an OS or other supervisor software). In such cases, to configure a cache memory to perform the filtering described herein, this instruction may be executed within a driver (or a setuid utility). To effect the configuration of a cache memory for an application, such as an HPC application to execute on a HPC system in which production applications are run for hours/days, this privileged instruction can be executed to configure the cache prior to initialization and execution of such application. In some cases to provide consistency, prior to execution of a cache filter instruction as described herein, the implicated cache memory may first be flushed, to allow for reconfiguration.

In an embodiment, when a cache filter instruction is executed by control logic of a cache controller, a mask value included in or associated with the instruction may be written to a control register of the corresponding cache memory. In an embodiment, only the bits that are set at a one value in the mask value portion of the instruction, which may be a data portion of the instruction, are set in this control register (at corresponding bit positions). All other bits in this register are set to zero (which indicates a do not care).

Then during memory operations in normal program execution, before a memory access request is executed in the cache memory, e.g., by performance of a lookup operation in the cache memory (on a load/store), the corresponding bits (e.g., bits 6-7 in the Table 3 example) of the load/store address are logically ANDed with the mask value in the control register. If the resulting value of this logical operation is all-zero (all bits are zero), then the memory access request and the corresponding cache line are not considered for caching in that cache. As such, the performance delay of any such lookup is avoided, and the memory access request may directly be sent to a further portion of a memory hierarchy.

Note that when configuring a cache memory to use certain bits of a memory address as index bits, any bit positions of the filter mask with a logic 1 in the control register are not used as part of the cache index. Instead, these address bits may be included as part of a cache tag. Conversely, the LSBs of a memory address (which in some cache memory implementations provide a cache tag) are used as part of the cache index. Therefore, the length of the cache tag and cache index is not changed. However, the bits that are used for the cache tag or cache index may change.

Note that based on encoding of a cache filter instruction as described herein, embodiments may be applied to a variety of different cache levels within a processor (such as LLC/L2/L3), if desired. In some cases, to restrict the number of bits in the mask, the least significant bits (e.g., the 6 LSBs of Tables 2 and 3 for a given byte location within a cache line) can be restricted from being part of the bit mask. Note further that this bit mask may provide for wide flexibility, using a small number of bits. For example, with as few as 3 bits, configurability by steps of 12.5% ($\frac{1}{2^3}$) of cache size may be provided. The number of mask bits can be dependent on the architecture or can be specified as an operand of the instruction.

Understand that in embodiments providing for a directory-based cache coherency protocol, distributed directory portions (e.g., caching home agents), which control which cache lines are to be provided to which cache agent, can consider the same bit mask to avoid sending ineligible addresses to the memory-side cache in the first place, so that the memory-side cache does not receive requests for ineligible addresses. Still further, such directory operation also may avoid sending cache coherency messages such as snoop requests for these non-cached portions of an addressable memory space, further improving efficiency of memory addressing because requests with ineligible addresses can be sent to DRAM directly without a cache lookup and/or coherency operations.

Although the following embodiments are described with reference to a processor, other embodiments are applicable to other types of integrated circuits and logic devices. Similar techniques and teachings of embodiments of the present disclosure may be applied to other types of circuits or semiconductor devices that may benefit from higher pipeline throughput and improved performance. The teachings of embodiments of the present disclosure are applicable to any processor or machine that performs data manipulations. However, the embodiments are not limited to processors or machines that perform 512-bit, 256-bit, 128-bit, 64-bit, 32-bit, or 16-bit data operations and may be applied to any processor and machine in which manipulation or management of data may be performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure may be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions may be used to cause a general-purpose or special-purpose processor that may be programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Furthermore, steps of embodiments of the present disclosure might be performed by specific hardware components that contain fixed-function logic for performing the steps, or by any combination of programmed computer components and fixed-function hardware components.

Instructions used to program logic to perform embodiments of the present disclosure may be stored within a memory in the system, such as DRAM, cache, flash memory, or other storage. Furthermore, the instructions may be distributed via a network or by way of other computer-readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium may include any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as may be useful in simulations, the hardware may be represented using a hardware description language or another functional description language. Additionally, a circuit level model with logic and/or transistor gates may be produced at some stages of the design process. Furthermore, designs, at some stage, may reach a level of data representing the physical placement of various devices in the hardware model. In cases wherein some semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or retransmission of the electrical signal is performed, a new copy may be made. Thus, a communication provider or a network provider may store on a tangible, machine-readable medium, at least temporarily, an article, such as information encoded into a carrier wave, embodying techniques of embodiments of the present disclosure.

In modern processors, a number of different execution units may be used to process and execute a variety of code and instructions. Some instructions may be quicker to complete while others may take a number of clock cycles to complete. The faster the throughput of instructions, the better the overall performance of the processor. Thus it would be advantageous to have as many instructions execute as fast as possible. However, there may be certain instructions that have greater complexity and require more in terms of execution time and processor resources, such as floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which may include processor logic and circuits used to implement one or more instruction sets. Accordingly, processors with different micro-architectures may share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

An instruction may include one or more instruction formats. In one embodiment, an instruction format may indicate various fields (number of bits, location of bits, etc.) to specify, among other things, the operation to be performed and the operands on which that operation will be performed. In a further embodiment, some instruction formats may be further defined by instruction templates (or sub-formats). For example, the instruction templates of a given instruction format may be defined to have different subsets of the instruction format's fields and/or defined to have a given field interpreted differently. In one embodiment, an instruction may be expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that may logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type may be referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data may be generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that may include execution units to execute an instruction, in accordance with embodiments of the present disclosure. System 100 may include a component, such as a processor 102 to employ execution units including logic to perform algorithms for process data, in accordance with the present disclosure, such as in the embodiment described herein. System 100 may be representative of processing systems based on the PENTIUM™ III, PENTIUM™ 4, Xeon™, Itanium™, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Embodiments of the present disclosure may be used in other devices such as handheld devices and embedded applications. Some examples of handheld devices include cellular phones, Internet Protocol devices, digital cameras, personal digital assistants (PDAs), and handheld PCs. Embedded applications may include a micro controller, a digital signal processor (DSP), system on a chip, network computers (NetPC), set-top boxes, network hubs, wide area network (WAN) switches, or any other system that may perform one or more instructions in accordance with at least one embodiment.

Computer system 100 may include a processor 102 that may include one or more execution units 108 to perform an algorithm to perform at least one instruction in accordance with one embodiment of the present disclosure. One embodiment may be described in the context of a single processor desktop or server system, but other embodiments may be included in a multiprocessor system. System 100 may be an example of a 'hub' system architecture. System 100 may include a processor 102 for processing data signals. Processor 102 may include a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In one embodiment, processor 102 may be coupled to a processor bus 110 that may transmit data signals between processor 102 and other components in system 100. The elements of system 100 may perform conventional functions that are well known to those familiar with the art.

In one embodiment, processor 102 may include a Level 1 (L1) internal cache memory 104. Depending on the architecture, the processor 102 may have a single internal cache or multiple levels of internal cache. In another embodiment, the cache memory may reside external to processor 102. Other embodiments may also include a combination of both internal and external caches depending on the particular implementation and needs. Register file 106 may store different types of data in various registers including integer registers, floating point registers, status registers, and instruction pointer register.

Execution unit 108, including logic to perform integer and floating point operations, also resides in processor 102. Processor 102 may also include a microcode (ucode) ROM that stores microcode for certain macroinstructions. In one embodiment, execution unit 108 may include logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications may be accelerated and executed more efficiently by using the full width of a processor's data bus for performing operations on packed data. This may eliminate the need to transfer smaller units of data across the processor's data bus to perform one or more operations one data element at a time.

Embodiments of an execution unit 108 may also be used in micro controllers, embedded processors, graphics devices, DSPs, and other types of logic circuits. System 100 may include a memory 120. Memory 120 may be implemented as a dynamic random access memory (DRAM) device, a static random access memory (SRAM) device, flash memory device, or other memory device. Memory 120 may store instructions and/or data represented by data signals that may be executed by processor 102.

A system logic chip 116 may be coupled to processor bus 110 and memory 120. System logic chip 116 may include a memory controller hub (MCH). Processor 102 may communicate with MCH 116 via a processor bus 110. MCH 116 may provide a high bandwidth memory path 118 to memory 120 for instruction and data storage and for storage of graphics commands, data and textures. MCH 116 may direct data signals between processor 102, memory 120, and other components in system 100 and to bridge the data signals between processor bus 110, memory 120, and system I/O 122. In some embodiments, the system logic chip 116 may provide a graphics port for coupling to a graphics controller 112. MCH 116 may be coupled to memory 120 through a memory interface 118. Graphics card 112 may be coupled to MCH 116 through an Accelerated Graphics Port (AGP) interconnect 114.

System 100 may use a proprietary hub interface bus 122 to couple MCH 116 to I/O controller hub (ICH) 130. In one embodiment, ICH 130 may provide direct connections to some I/O devices via a local I/O bus. The local I/O bus may include a high-speed I/O bus for connecting peripherals to memory 120, chipset, and processor 102. Examples may include the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. Data storage device 124 may comprise a hard disk drive, a floppy disk drive, a CD-ROM device, a flash memory device, or other mass storage device.

For another embodiment of a system, an instruction in accordance with one embodiment may be used with a system on a chip. One embodiment of a system on a chip comprises of a processor and a memory. The memory for one such system may include a flash memory. The flash memory may be located on the same die as the processor and other system components. Additionally, other logic blocks such as a memory controller or graphics controller may also be located on a system on a chip.

Figure 1B:
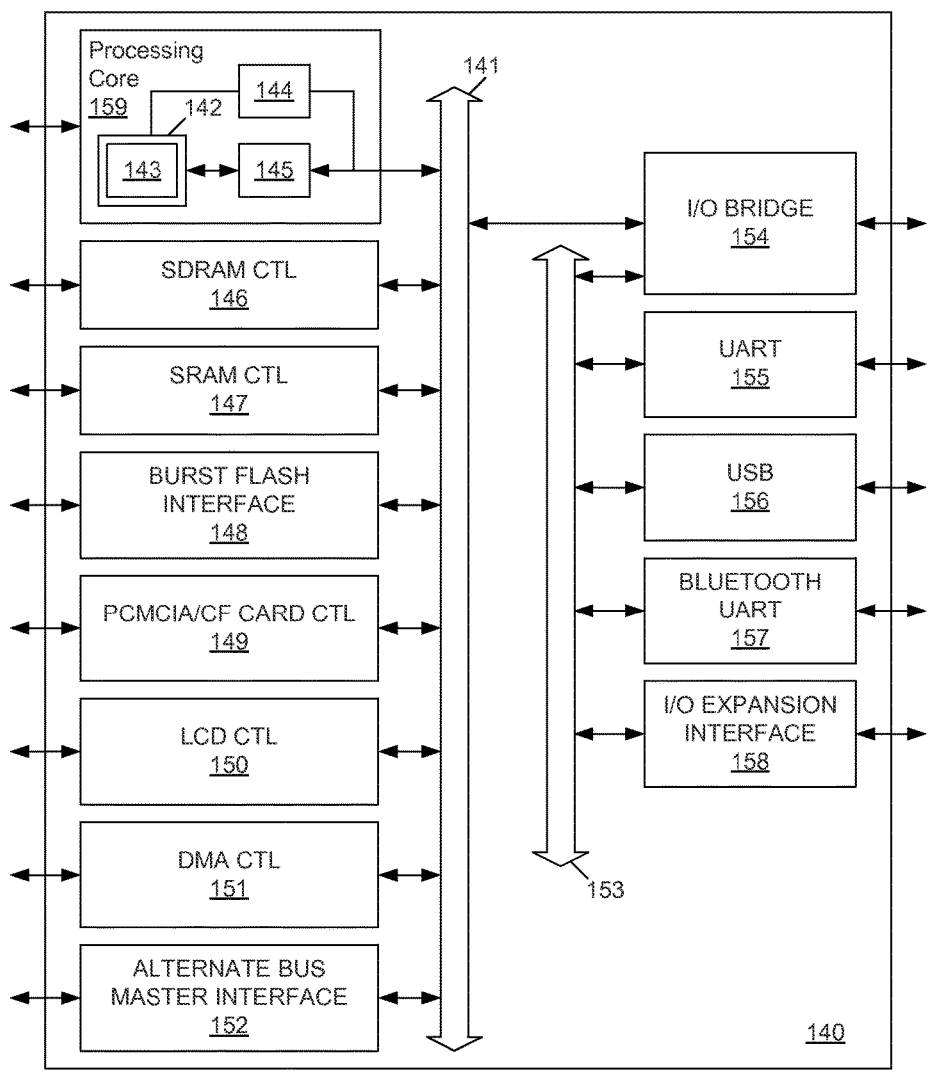
FIG. 1B illustrates a data processing system, in accordance with embodiments of the present disclosure.

FIG. 1B illustrates a data processing system 140 which implements the principles of embodiments of the present disclosure. It will be readily appreciated by one of skill in the art that the embodiments described herein may operate with alternative processing systems without departure from the scope of embodiments of the disclosure.

Computer system 140 comprises a processing core 159 for performing at least one instruction in accordance with one embodiment. In one embodiment, processing core 159 represents a processing unit of any type of architecture, including but not limited to a CISC, a RISC or a VLIW type architecture. Processing core 159 may also be suitable for manufacture in one or more process technologies and by being represented on a machine-readable media in sufficient detail, may be suitable to facilitate said manufacture.

Processing core 159 comprises an execution unit 142, a set of register files 145, and a decoder 144. Processing core 159 may also include additional circuitry (not shown) which may be unnecessary to the understanding of embodiments of the present disclosure. Execution unit 142 may execute instructions received by processing core 159. In addition to performing typical processor instructions, execution unit 142 may perform instructions in packed instruction set 143 for performing operations on packed data formats. Packed instruction set 143 may include instructions for performing embodiments of the disclosure and other packed instructions. Execution unit 142 may be coupled to register file 145 by an internal bus. Register file 145 may represent a storage area on processing core 159 for storing information, including data. As previously mentioned, it is understood that the storage area may store the packed data might not be critical. Execution unit 142 may be coupled to decoder 144. Decoder 144 may decode instructions received by processing core 159 into control signals and/or microcode entry points. In response to these control signals and/or microcode entry points, execution unit 142 performs the appropriate operations. In one embodiment, the decoder may interpret the opcode of the instruction, which will indicate what operation should be performed on the corresponding data indicated within the instruction.

Processing core 159 may be coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 that may perform SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
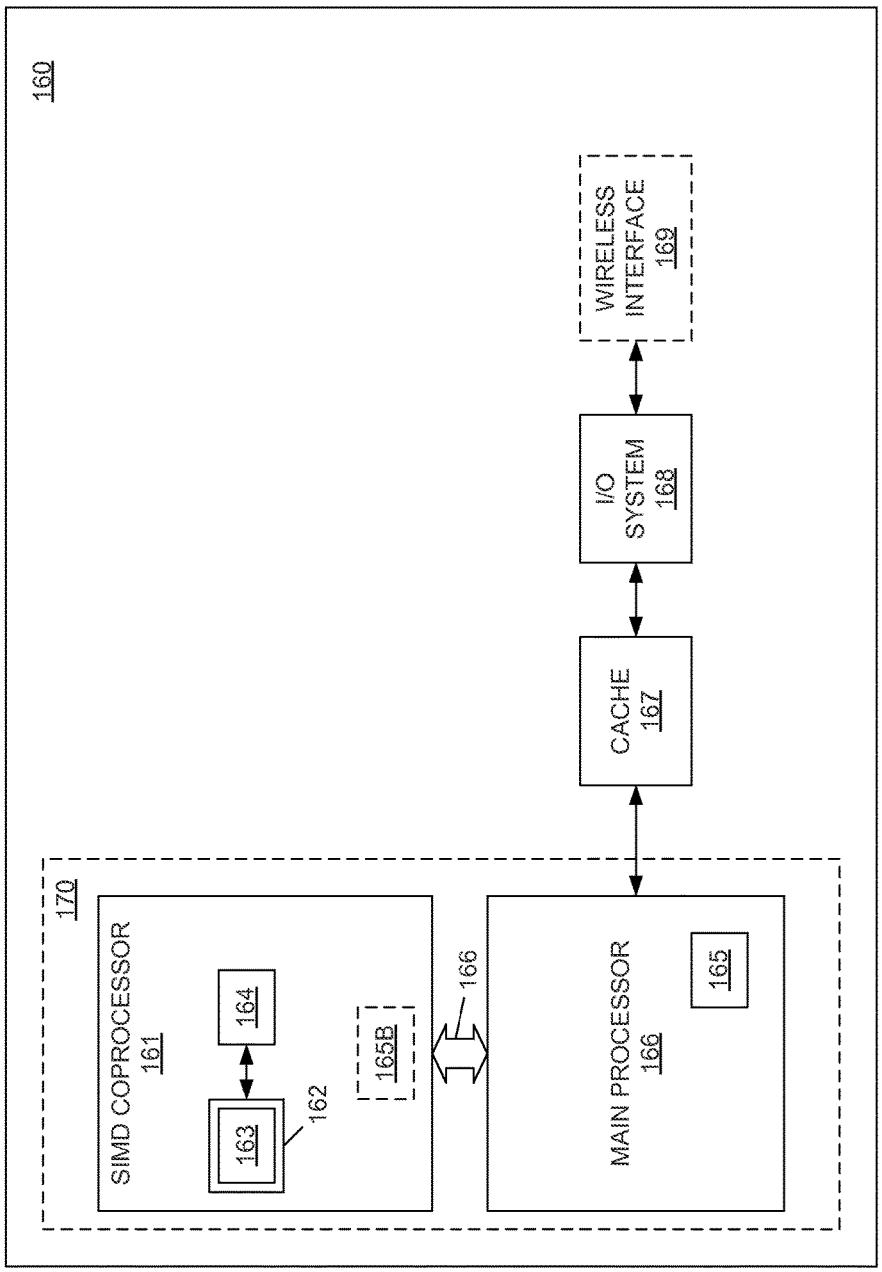
FIG. 1C illustrates another embodiment of a data processing system to perform operations in accordance with embodiments of the present disclosure.

FIG. 1C illustrates another embodiment of a data processing system to perform operations in accordance with embodiments of the present disclosure. In one embodiment, data processing system 160 may include a main processor 166, a SIMD coprocessor 161, a cache memory 167, and an input/output system 168. Input/output system 168 may optionally be coupled to a wireless interface 169. SIMD coprocessor 161 may perform operations including instructions in accordance with one embodiment. In one embodiment, processing core 170 may be suitable for manufacture in one or more process technologies and by being represented on a machine-readable media in sufficient detail, may be suitable to facilitate the manufacture of all or part of data processing system 160 including processing core 170.

In one embodiment, SIMD coprocessor 161 comprises an execution unit 162 and a set of register files 164. One embodiment of main processor 165 comprises a decoder 165 to recognize instructions of instruction set 163 including instructions in accordance with one embodiment for execution by execution unit 162. In other embodiments, SIMD coprocessor 161 also comprises at least part of decoder 165 to decode instructions of instruction set 163. Processing core 170 may also include additional circuitry (not shown) which may be unnecessary to the understanding of embodiments of the present disclosure.

In operation, main processor 166 executes a stream of data processing instructions that control data processing operations of a general type including interactions with cache memory 167, and input/output system 168. Embedded within the stream of data processing instructions may be SIMD coprocessor instructions. Decoder 165 of main processor 166 recognizes these SIMD coprocessor instructions as being of a type that should be executed by an attached SIMD coprocessor 161. Accordingly, main processor 166 issues these SIMD coprocessor instructions (or control signals representing SIMD coprocessor instructions) on the coprocessor bus 166. From coprocessor bus 166, these instructions may be received by any attached SIMD coprocessors. In this case, SIMD coprocessor 161 may accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. In one embodiment of processing core 170, main processor 166, and a SIMD coprocessor 161 may be integrated into a single processing core 170 comprising an execution unit 162, a set of register files 164, and a decoder 165 to recognize instructions of instruction set 163 including instructions in accordance with one embodiment.

Figure 2:
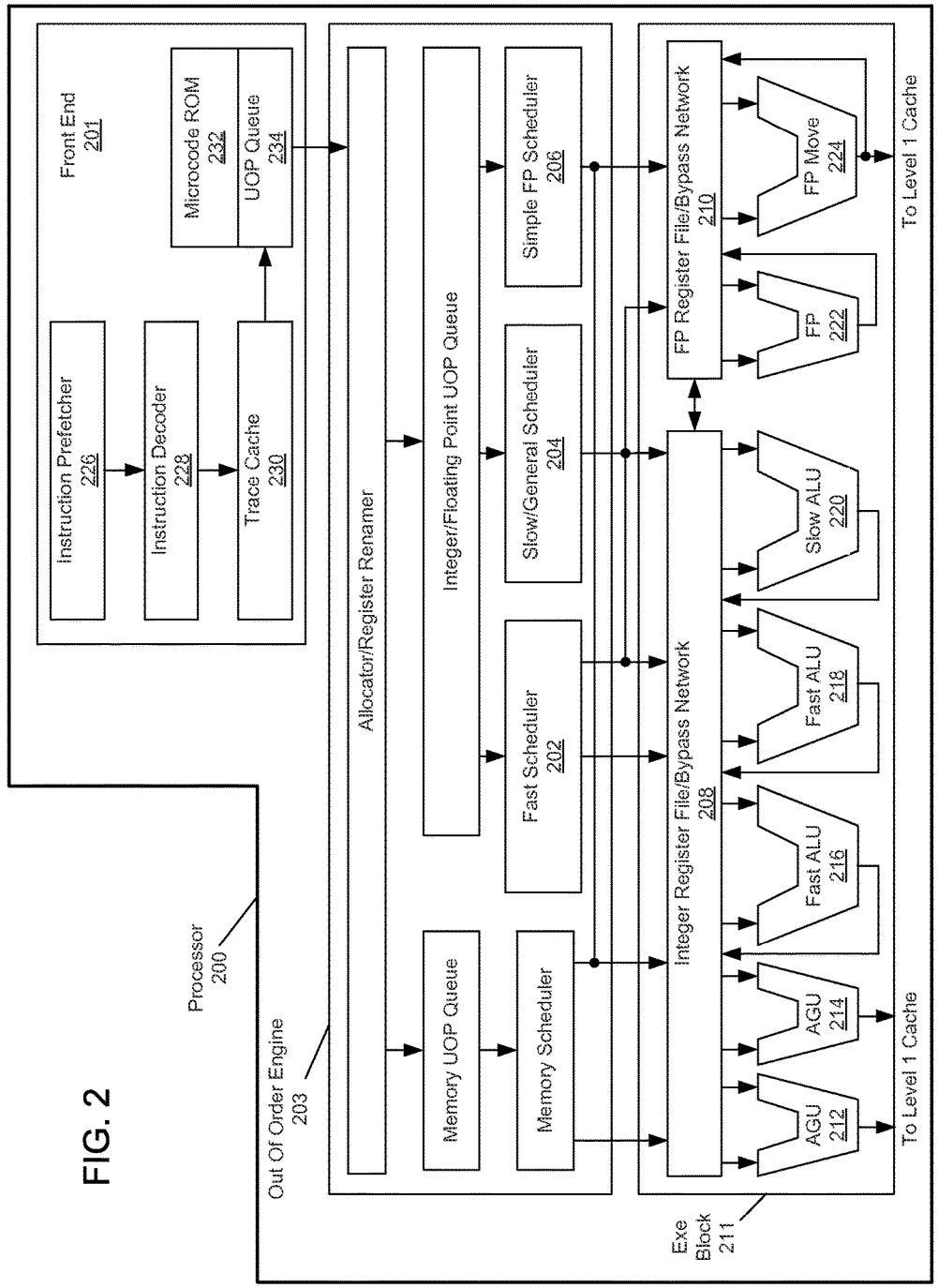
FIG. 2 is a block diagram of the micro-architecture for a processor that may include logic circuits to perform instructions, in accordance with embodiments of the present disclosure.

FIG. 2 is a block diagram of the micro-architecture for a processor 200 that may include logic circuits to perform instructions, in accordance with embodiments of the present disclosure. In some embodiments, an instruction in accordance with one embodiment may be implemented to operate on data elements having sizes of byte, word, doubleword, quadword, etc., as well as datatypes, such as single and double precision integer and floating point datatypes. In one embodiment, in-order front end 201 may implement a part of processor 200 that may fetch instructions to be executed and prepares the instructions to be used later in the processor pipeline. Front end 201 may include several units. In one embodiment, instruction prefetcher 226 fetches instructions from memory and feeds the instructions to an instruction decoder 228 which in turn decodes or interprets the instructions. For example, in one embodiment, the decoder decodes a received instruction into one or more operations called "micro-instructions" or "micro-operations" (also called micro op or uops) that the machine may execute. In other embodiments, the decoder parses the instruction into an opcode and corresponding data and control fields that may be used by the micro-architecture to perform operations in accordance with one embodiment. In one embodiment, trace cache 230 may assemble decoded uops into program ordered sequences or traces in uop queue 234 for execution. When trace cache 230 encounters a complex instruction, microcode ROM 232 provides the uops needed to complete the operation.

Some instructions may be converted into a single micro-op, whereas others need several micro-ops to complete the full operation. In one embodiment, if more than four micro-ops are needed to complete an instruction, decoder 228 may access microcode ROM 232 to perform the instruction. In one embodiment, an instruction may be decoded into a small number of micro ops for processing at instruction decoder 228. In another embodiment, an instruction may be stored within microcode ROM 232 should a number of micro-ops be needed to accomplish the operation. Trace cache 230 refers to an entry point programmable logic array (PLA) to determine a correct micro-instruction pointer for reading the micro-code sequences to complete one or more instructions in accordance with one embodiment from micro-code ROM 232. After microcode ROM 232 finishes sequencing micro-ops for an instruction, front end 201 of the machine may resume fetching micro-ops from trace cache 230.

Out-of-order execution engine 203 may prepare instructions for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. Uop schedulers 202, 204, 206, determine when a uop is ready to execute based on the readiness of their dependent input register operand sources and the availability of the execution resources the uops need to complete their operation. Fast scheduler 202 of one embodiment may schedule on each half of the main clock cycle while the other schedulers may only schedule once per main processor clock cycle. The schedulers arbitrate for the dispatch ports to schedule uops for execution.

Register files 208, 210 may be arranged between schedulers 202, 204, 206, and execution units 212, 214, 216, 218, 220, 222, 224 in execution block 211. Each of register files 208, 210 perform integer and floating point operations, respectively. Each register file 208, 210, may include a bypass network that may bypass or forward just completed results that have not yet been written into the register file to new dependent uops. Integer register file 208 and floating point register file 210 may communicate data with the other. In one embodiment, integer register file 208 may be split into two separate register files, one register file for low-order thirty-two bits of data and a second register file for high order thirty-two bits of data. Floating point register file 210 may include 128-bit wide entries because floating point instructions typically have operands from 64 to 128 bits in width.

Execution block 211 may contain execution units 212, 214, 216, 218, 220, 222, 224. Execution units 212, 214, 216, 218, 220, 222, 224 may execute the instructions. Execution block 211 may include register files 208, 210 that store the integer and floating point data operand values that the micro-instructions need to execute. In one embodiment, processor 200 may comprise a number of execution units: address generation unit (AGU) 212, AGU 214, fast ALU 216, fast ALU 218, slow ALU 220, floating point ALU 222, floating point move unit 224. In another embodiment, floating point execution blocks 222, 224, may execute floating point, MMX, SIMD, and SSE, or other operations. In yet another embodiment, floating point ALU 222 may include a 64-bit by 64-bit floating point divider to execute divide, square root, and remainder micro-ops. In various embodiments, instructions involving a floating point value may be handled with the floating point hardware. In one embodiment, ALU operations may be passed to high-speed ALU execution units 216, 218. High-speed ALUs 216, 218 may execute fast operations with an effective latency of half a clock cycle. In one embodiment, most complex integer operations go to slow ALU 220 as slow ALU 220 may include integer execution hardware for long-latency type of operations, such as a multiplier, shifts, flag logic, and branch processing. Memory load/store operations may be executed by AGUs 212, 214. In one embodiment, integer ALUs 216, 218, 220 may perform integer operations on 64-bit data operands. In other embodiments, ALUs 216, 218, 220 may be implemented to support a variety of data bit sizes including sixteen, thirty-two, 128, 256, etc. Similarly, floating point units 222, 224 may be implemented to support a range of operands having bits of various widths. In one embodiment, floating point units 222, 224, may operate on 128-bit wide packed data operands in conjunction with SIMD and multimedia instructions.

In one embodiment, uops schedulers 202, 204, 206, dispatch dependent operations before the parent load has finished executing. As uops may be speculatively scheduled and executed in processor 200, processor 200 may also include logic to handle memory misses. If a data load misses in the data cache, there may be dependent operations in flight in the pipeline that have left the scheduler with temporarily incorrect data. A replay mechanism tracks and re-executes instructions that use incorrect data. Only the dependent operations might need to be replayed and the independent ones may be allowed to complete. The schedulers and replay mechanism of one embodiment of a processor may also be designed to catch instruction sequences for text string comparison operations.

The term "registers" may refer to the on-board processor storage locations that may be used as part of instructions to identify operands. In other words, registers may be those that may be usable from the outside of the processor (from a programmer's perspective). However, in some embodiments registers might not be limited to a particular type of circuit. Rather, a register may store data, provide data, and perform the functions described herein. The registers described herein may be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit integer data. A register file of one embodiment also contains eight multimedia SIMD registers for packed data. For the discussions below, the registers may be understood to be data registers designed to hold packed data, such as 64-bit wide MMX™ registers (also referred to as 'mm' registers in some instances) in microprocessors enabled with MMX technology from Intel Corporation of Santa Clara, Calif. These MMX registers, available in both integer and floating point forms, may operate with packed data elements that accompany SIMD and SSE instructions. Similarly, 128-bit wide XMM registers relating to SSE2, SSE3, SSE4, or beyond (referred to generically as "SSEx") technology may hold such packed data operands. In one embodiment, in storing packed data and integer data, the registers do not need to differentiate between the two data types. In one embodiment, integer and floating point may be contained in the same register file or different register files. Furthermore, in one embodiment, floating point and integer data may be stored in different registers or the same registers.

Figure 3A:
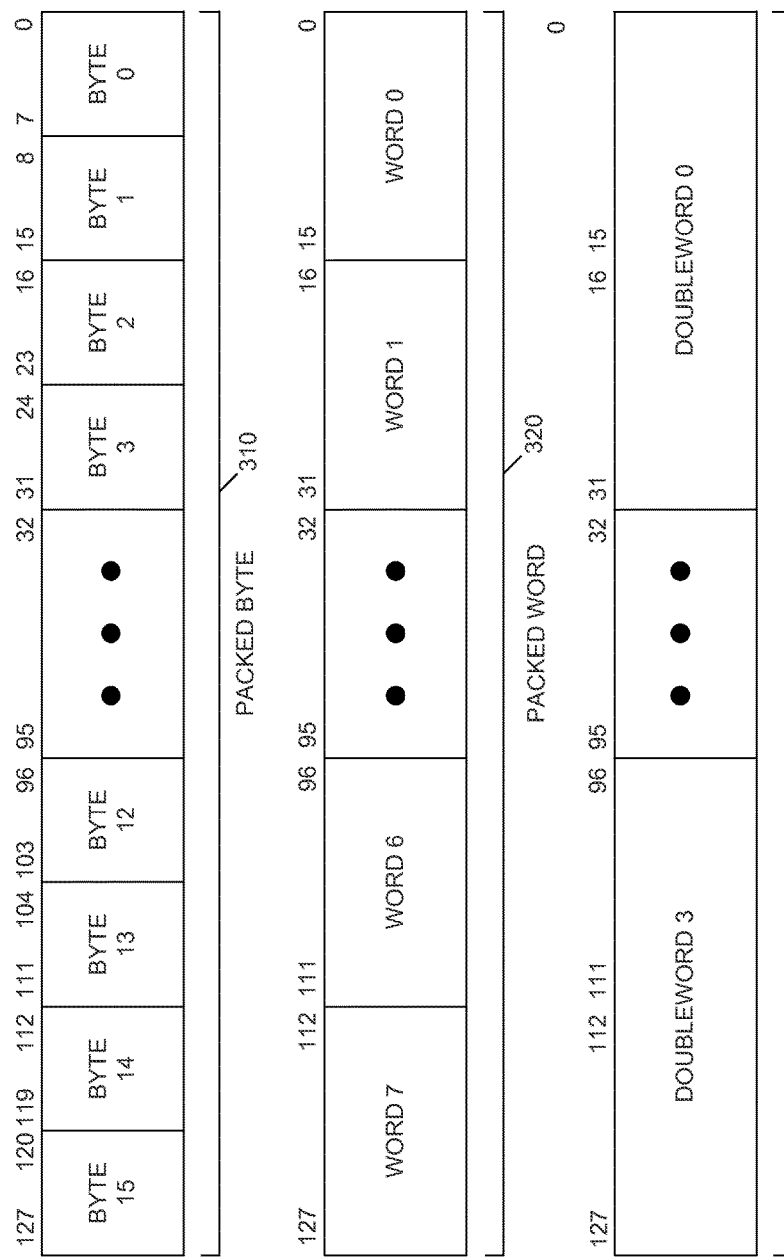
FIG. 3A illustrates various packed data type representations in multimedia registers, in accordance with embodiments of the present disclosure.

In the examples of the following figures, a number of data operands may be described. FIG. 3A illustrates various packed data type representations in multimedia registers, in accordance with embodiments of the present disclosure. FIG. 3A illustrates data types for a packed byte 310, a packed word 320, and a packed doubleword (dword) 330 for 128-bit wide operands. Packed byte format 310 of this example may be 128 bits long and contains sixteen packed byte data elements. A byte may be defined, for example, as eight bits of data. Information for each byte data element may be stored in bit 7 through bit 0 for byte 0, bit 15 through bit 8 for byte 1, bit 23 through bit 16 for byte 2, and finally bit 120 through bit 127 for byte 15. Thus, all available bits may be used in the register. This storage arrangement increases the storage efficiency of the processor. As well, with sixteen data elements accessed, one operation may now be performed on sixteen data elements in parallel.

Generally, a data element may include an individual piece of data that is stored in a single register or memory location with other data elements of the same length. In packed data sequences relating to SSEx technology, the number of data elements stored in a XMM register may be 128 bits divided by the length in bits of an individual data element. Similarly, in packed data sequences relating to MMX and SSE technology, the number of data elements stored in an MMX register may be 64 bits divided by the length in bits of an individual data element. Although the data types illustrated in FIG. 3A may be 128 bits long, embodiments of the present disclosure may also operate with 64-bit wide or other sized operands. Packed word format 320 of this example may be 128 bits long and contains eight packed word data elements. Each packed word contains sixteen bits of information. Packed doubleword format 330 of FIG. 3A may be 128 bits long and contains four packed doubleword data elements. Each packed doubleword data element contains thirty-two bits of information. A packed quadword may be 128 bits long and contain two packed quad-word data elements.

Figure 3B:
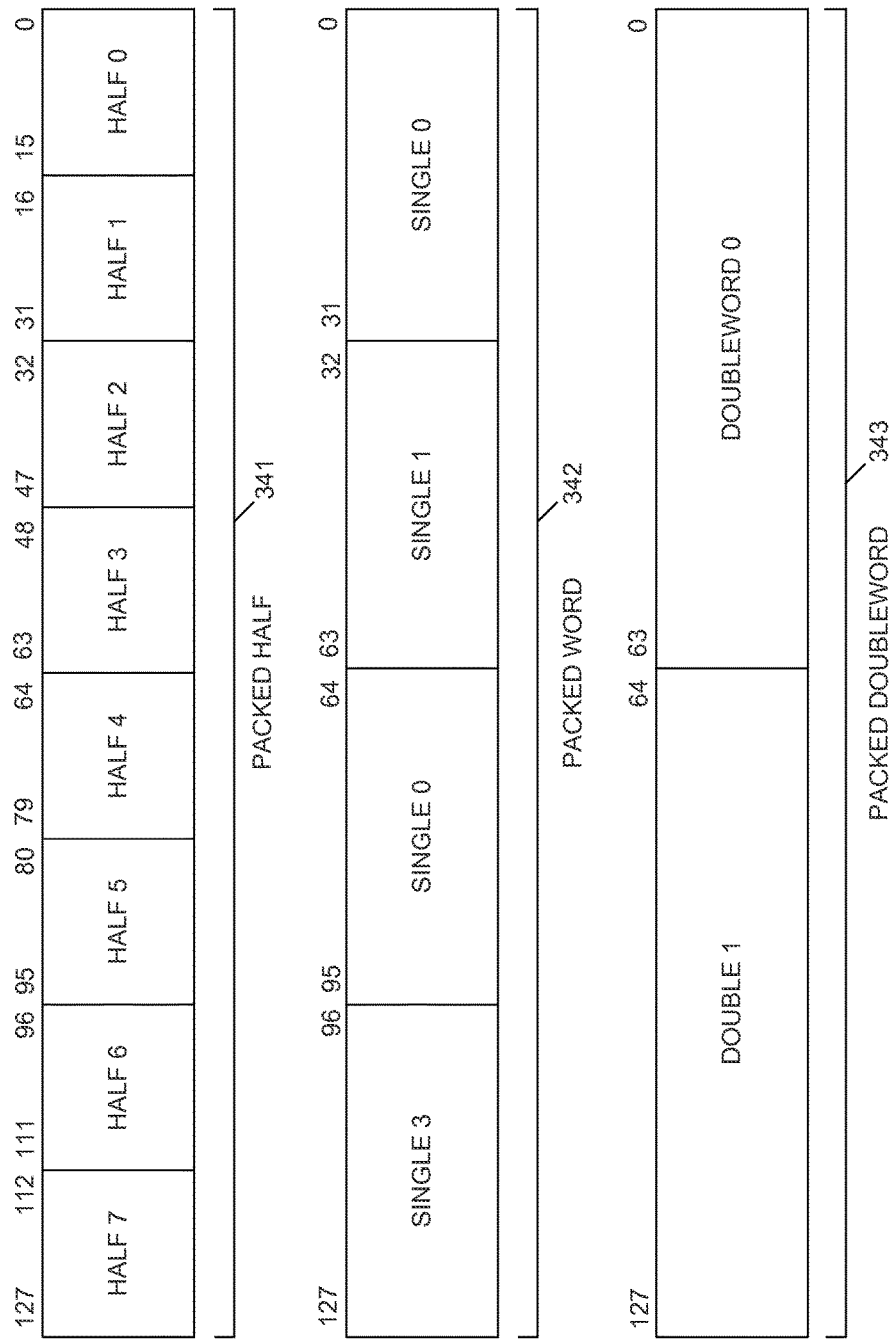
FIG. 3B illustrates possible in-register data storage formats, in accordance with embodiments of the present disclosure.

FIG. 3B illustrates possible in-register data storage formats, in accordance with embodiments of the present disclosure. Each packed data may include more than one independent data element. Three packed data formats are illustrated; packed half 341, packed single 342, and packed double 343. One embodiment of packed half 341, packed single 342, and packed double 343 contain fixed-point data elements. For another embodiment one or more of packed half 341, packed single 342, and packed double 343 may contain floating-point data elements. One embodiment of packed half 341 may be 128 bits long containing eight 16-bit data elements. One embodiment of packed single 342 may be 128 bits long and contains four 32-bit data elements. One embodiment of packed double 343 may be 128 bits long and contains two 64-bit data elements. It will be appreciated that such packed data formats may be further extended to other register lengths, for example, to 96-bits, 160-bits, 192-bits, 224-bits, 256-bits or more.

FIG. 3C illustrates various signed and unsigned packed data type representations in multimedia registers, in accordance with embodiments of the present disclosure. Unsigned packed byte representation 344 illustrates the storage of an unsigned packed byte in a SIMD register. Information for each byte data element may be stored in bit 7 through bit 0 for byte 0, bit 15 through bit 8 for byte 1, bit 23 through bit 16 for byte 2, and finally bit 120 through bit 127 for byte 15. Thus, all available bits may be used in the register. This storage arrangement may increase the storage efficiency of the processor. As well, with sixteen data elements accessed, one operation may now be performed on sixteen data elements in a parallel fashion. Signed packed byte representation 345 illustrates the storage of a signed packed byte. Note that the eighth bit of every byte data element may be the sign indicator. Unsigned packed word representation 346 illustrates how word seven through word zero may be stored in a SIMD register. Signed packed word representation 347 may be similar to the unsigned packed word in-register representation 346. Note that the sixteenth bit of each word data element may be the sign indicator. Unsigned packed doubleword representation 348 shows how doubleword data elements are stored. Signed packed doubleword representation 349 may be similar to unsigned packed doubleword in-register representation 348. Note that the necessary sign bit may be the thirty-second bit of each doubleword data element.

Figure 3D:
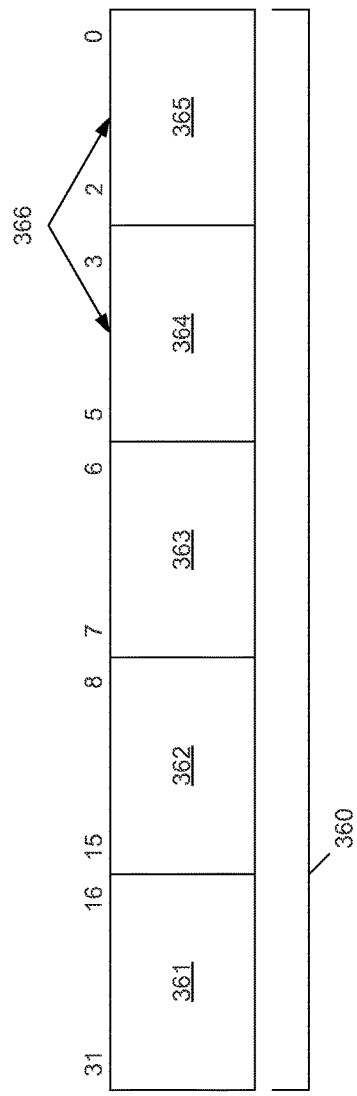
FIG. 3D illustrates an embodiment of an operation encoding format.

FIG. 3D illustrates an embodiment of an operation encoding (opcode). Furthermore, format 360 may include register/memory operand addressing modes corresponding with a type of opcode format described in the "IA-32 Intel Architecture Software Developer's Manual Volume 2: Instruction Set Reference," which is available from Intel Corporation, Santa Clara, Calif. on the world-wide-web (www) at intel.com/design/litcentr. In one embodiment, and instruction may be encoded by one or more of fields 361 and 362. Up to two operand locations per instruction may be identified, including up to two source operand identifiers 364 and 365. In one embodiment, destination operand identifier 366 may be the same as source operand identifier 364, whereas in other embodiments they may be different. In another embodiment, destination operand identifier 366 may be the same as source operand identifier 365, whereas in other embodiments they may be different. In one embodiment, one of the source operands identified by source operand identifiers 364 and 365 may be overwritten by the results of the text string comparison operations, whereas in other embodiments identifier 364 corresponds to a source register element and identifier 365 corresponds to a destination register element. In one embodiment, operand identifiers 364 and 365 may identify 32-bit or 64-bit source and destination operands.

Figure 3E:
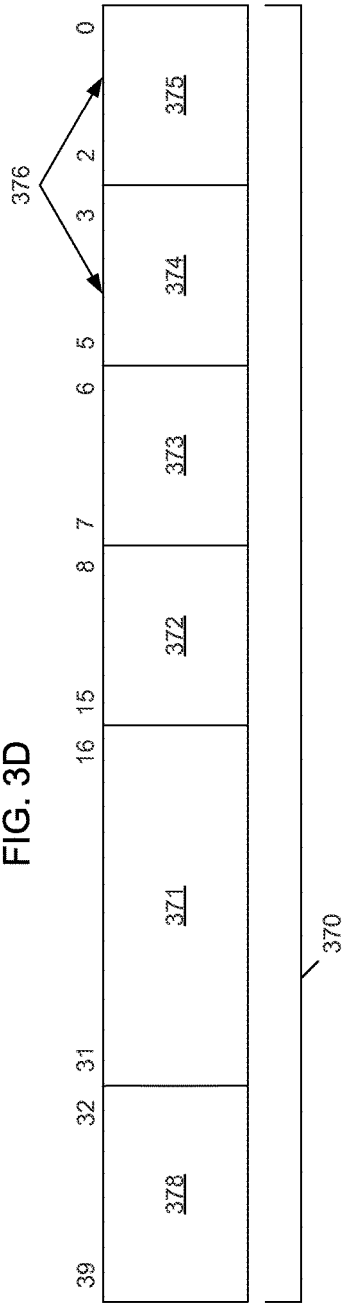
FIG. 3E illustrates another possible operation encoding format having forty or more bits, in accordance with embodiments of the present disclosure.

FIG. 3E illustrates another possible operation encoding (opcode) format 370, having forty or more bits, in accordance with embodiments of the present disclosure. Opcode format 370 corresponds with opcode format 360 and comprises an optional prefix byte 378. An instruction according to one embodiment may be encoded by one or more of fields 378, 371, and 372. Up to two operand locations per instruction may be identified by source operand identifiers 374 and 375 and by prefix byte 378. In one embodiment, prefix byte 378 may be used to identify 32-bit or 64-bit source and destination operands. In one embodiment, destination operand identifier 376 may be the same as source operand identifier 374, whereas in other embodiments they may be different. For another embodiment, destination operand identifier 376 may be the same as source operand identifier 375, whereas in other embodiments they may be different. In one embodiment, an instruction operates on one or more of the operands identified by operand identifiers 374 and 375 and one or more operands identified by operand identifiers 374 and 375 may be overwritten by the results of the instruction, whereas in other embodiments, operands identified by identifiers 374 and 375 may be written to another data element in another register. Opcode formats 360 and 370 allow register to register, memory to register, register by memory, register by register, register by immediate, register to memory addressing specified in part by MOD fields 363 and 373 and by optional scale-index-base and displacement bytes.

Figure 3F:
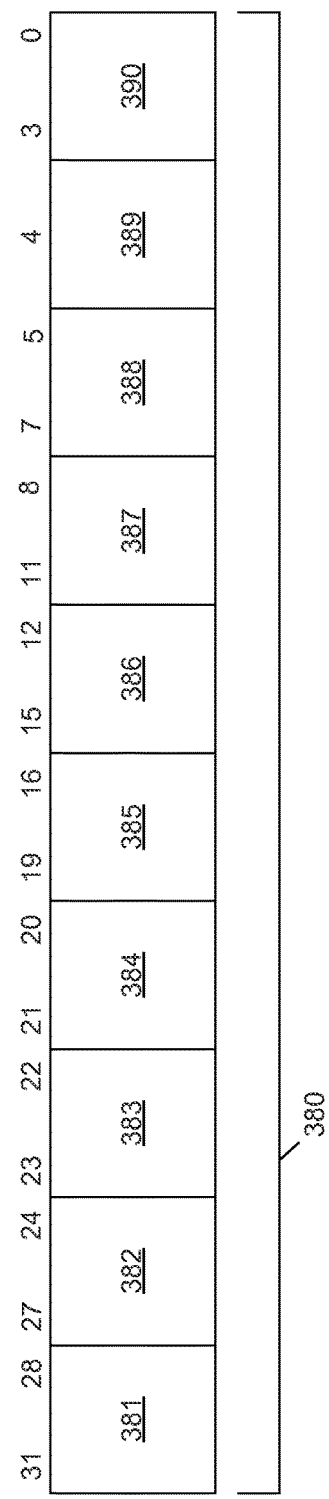
FIG. 3F illustrates yet another possible operation encoding format, in accordance with embodiments of the present disclosure.

FIG. 3F illustrates yet another possible operation encoding (opcode) format, in accordance with embodiments of the present disclosure. 64-bit single instruction multiple data (SIMD) arithmetic operations may be performed through a coprocessor data processing (CDP) instruction. Operation encoding (opcode) format 380 depicts one such CDP instruction having CDP opcode fields 382 an0064 389. The type of CDP instruction, for another embodiment, operations may be encoded by one or more of fields 383, 384, 387, and 388. Up to three operand locations per instruction may be identified, including up to two source operand identifiers 385 and 390 and one destination operand identifier 386. One embodiment of the coprocessor may operate on eight, sixteen, thirty-two, and 64-bit values. In one embodiment, an instruction may be performed on integer data elements. In some embodiments, an instruction may be executed conditionally, using condition field 381. For some embodiments, source data sizes may be encoded by field 383. In some embodiments, Zero (Z), negative (N), carry (C), and overflow (V) detection may be done on SIMD fields. For some instructions, the type of saturation may be encoded by field 384.

FIG. 4A is a block diagram illustrating an in-order pipeline and a register renaming stage, out-of-order issue/execution pipeline, in accordance with embodiments of the present disclosure. FIG. 4B is a block diagram illustrating an in-order architecture core and a register renaming logic, out-of-order issue/execution logic to be included in a processor, in accordance with embodiments of the present disclosure. The solid lined boxes in FIG. 4A illustrate the in-order pipeline, while the dashed lined boxes illustrates the register renaming, out-of-order issue/execution pipeline. Similarly, the solid lined boxes in FIG. 4B illustrate the in-order architecture logic, while the dashed lined boxes illustrates the register renaming logic and out-of-order issue/execution logic.

In FIG. 4A, a processor pipeline 400 may include a fetch stage 402, a length decode stage 404, a decode stage 406, an allocation stage 408, a renaming stage 410, a scheduling (also known as a dispatch or issue) stage 412, a register read/memory read stage 414, an execute stage 416, a write-back/memory-write stage 418, an exception handling stage 422, and a commit stage 424.

In FIG. 4B, arrows denote a coupling between two or more units and the direction of the arrow indicates a direction of data flow between those units. FIG. 4B shows processor core 490 including a front end unit 430 coupled to an execution engine unit 450, and both may be coupled to a memory unit 470.

Core 490 may be a reduced instruction set computing (RISC) core, a complex instruction set computing (CISC) core, a very long instruction word (VLIW) core, or a hybrid or alternative core type. In one embodiment, core 490 may be a special-purpose core, such as, for example, a network or communication core, compression engine, graphics core, or the like.

Front end unit 430 may include a branch prediction unit 432 coupled to an instruction cache unit 434. Instruction cache unit 434 may be coupled to an instruction translation lookaside buffer (TLB) 436. TLB 436 may be coupled to an instruction fetch unit 438, which is coupled to a decode unit 440. Decode unit 440 may decode instructions, and generate as an output one or more micro-operations, micro-code entry points, microinstructions, other instructions, or other control signals, which may be decoded from, or which otherwise reflect, or may be derived from, the original instructions. The decoder may be implemented using various different mechanisms. Examples of suitable mechanisms include, but are not limited to, look-up tables, hardware implementations, programmable logic arrays (PLAs), microcode read-only memories (ROMs), etc. In one embodiment, instruction cache unit 434 may be further coupled to a level 2 (L2) cache unit 476 in memory unit 470. Decode unit 440 may be coupled to a rename/allocator unit 452 in execution engine unit 450.

Execution engine unit 450 may include rename/allocator unit 452 coupled to a retirement unit 454 and a set of one or more scheduler units 456. Scheduler units 456 represent any number of different schedulers, including reservations stations, central instruction window, etc. Scheduler units 456 may be coupled to physical register file units 458. Each of physical register file units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. Physical register file units 458 may be overlapped by retirement unit 154 to illustrate various ways in which register renaming and out-of-order execution may be implemented (e.g., using one or more reorder buffers and one or more retirement register files, using one or more future files, one or more history buffers, and one or more retirement register files; using register maps and a pool of registers; etc.). Generally, the architectural registers may be visible from the outside of the processor or from a programmer's perspective. The registers might not be limited to any known particular type of circuit. Various different types of registers may be suitable as long as they store and provide data as described herein. Examples of suitable registers include, but might not be limited to, dedicated physical registers, dynamically allocated physical registers using register renaming, combinations of dedicated and dynamically allocated physical registers, etc. Retirement unit 454 and physical register file units 458 may be coupled to execution clusters 460. Execution clusters 460 may include a set of one or more execution units 162 and a set of one or more memory access units 464. Execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Scheduler units 456, physical register file units 458, and execution clusters 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file unit, and/or execution cluster—and in the case of a separate memory access pipeline, certain embodiments may be implemented in which only the execution cluster of this pipeline has memory access units 464). It should also be understood that where separate pipelines are used, one or more of these pipelines may be out-of-order issue/execution and the rest in-order.

The set of memory access units 464 may be coupled to memory unit 470, which may include a data TLB unit 472 coupled to a data cache unit 474 coupled to a level 2 (L2) cache unit 476. In one exemplary embodiment, memory access units 464 may include a load unit, a store address unit, and a store data unit, each of which may be coupled to data TLB unit 472 in memory unit 470. L2 cache unit 476 may be coupled to one or more other levels of cache and eventually to a main memory.

By way of example, the exemplary register renaming, out-of-order issue/execution core architecture may implement pipeline 400 as follows: 1) instruction fetch 438 may perform fetch and length decoding stages 402 and 404; 2) decode unit 440 may perform decode stage 406; 3) rename/allocator unit 452 may perform allocation stage 408 and renaming stage 410; 4) scheduler units 456 may perform schedule stage 412; 5) physical register file units 458 and memory unit 470 may perform register read/memory read stage 414; execution cluster 460 may perform execute stage 416; 6) memory unit 470 and physical register file units 458 may perform write-back/memory-write stage 418; 7) various units may be involved in the performance of exception handling stage 422; and 8) retirement unit 454 and physical register file units 458 may perform commit stage 424.

Core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads) in a variety of manners. Multithreading support may be performed by, for example, including time sliced multithreading, simultaneous multithreading (where a single physical core provides a logical core for each of the threads that physical core is simultaneously multithreading), or a combination thereof. Such a combination may include, for example, time sliced fetching and decoding and simultaneous multithreading thereafter such as in the Intel® Hyperthreading technology.

While register renaming may be described in the context of out-of-order execution, it should be understood that register renaming may be used in an in-order architecture. While the illustrated embodiment of the processor may also include a separate instruction and data cache units 434/474 and a shared L2 cache unit 476, other embodiments may have a single internal cache for both instructions and data, such as, for example, a Level 1 (L1) internal cache, or multiple levels of internal cache. In some embodiments, the system may include a combination of an internal cache and an external cache that may be external to the core and/or the processor. In other embodiments, all of the cache may be external to the core and/or the processor.

Figure 5A:
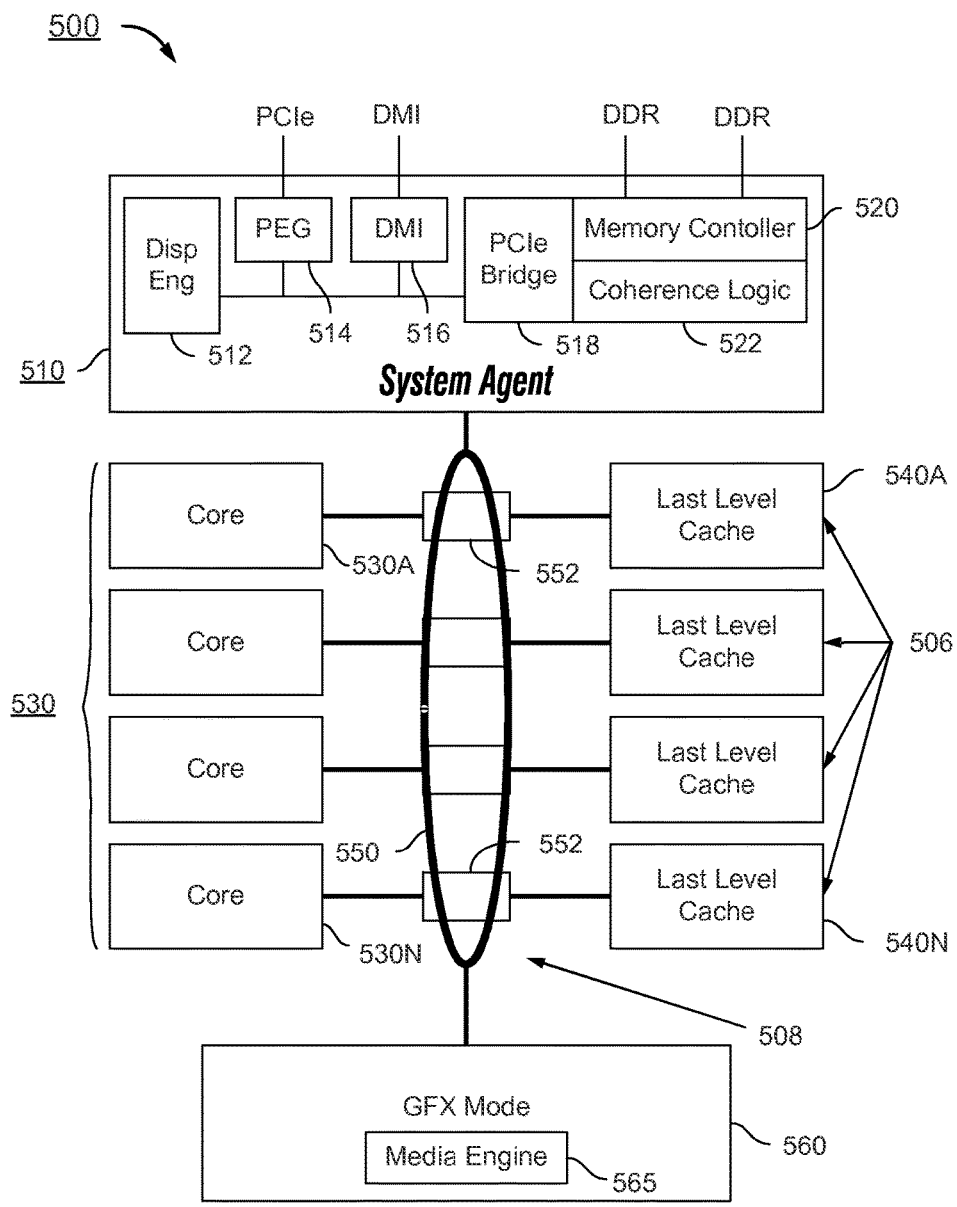
FIG. 5A is a block diagram of a processor, in accordance with embodiments of the present disclosure.

FIG. 5A is a block diagram of a processor 500, in accordance with embodiments of the present disclosure. In one embodiment, processor 500 may include a multicore processor. Processor 500 may include a system agent 510 communicatively coupled to one or more cores 502. Furthermore, cores 502 and system agent 510 may be communicatively coupled to one or more caches 506. Cores 502, system agent 510, and caches 506 may be communicatively coupled via one or more memory control units 552. Furthermore, cores 502, system agent 510, and caches 506 may be communicatively coupled to a graphics module 560 via memory control units 552.

Processor 500 may include any suitable mechanism for interconnecting cores 502, system agent 510, and caches 506, and graphics module 560. In one embodiment, processor 500 may include a ring-based interconnect unit 508 to interconnect cores 502, system agent 510, and caches 506, and graphics module 560. In other embodiments, processor 500 may include any number of well-known techniques for interconnecting such units. Ring-based interconnect unit 508 may utilize memory control units 552 to facilitate interconnections.

Processor 500 may include a memory hierarchy comprising one or more levels of caches within the cores, one or more shared cache units such as caches 506, or external memory (not shown) coupled to the set of integrated memory controller units 552. Caches 506 may include any suitable cache. In one embodiment, caches 506 may include one or more mid-level caches, such as level 2 (L2), level 3 (L3), level 4 (L4), or other levels of cache, a last level cache (LLC), and/or combinations thereof.

In various embodiments, one or more of cores 502 may perform multithreading. System agent 510 may include components for coordinating and operating cores 502. System agent unit 510 may include for example a power control unit (PCU). The PCU may be or include logic and components needed for regulating the power state of cores 502. System agent 510 may include a display engine 512 for driving one or more externally connected displays or graphics module 560. System agent 510 may include an interface 1214 for communications busses for graphics. In one embodiment, interface 1214 may be implemented by PCI Express (PCIe). In a further embodiment, interface 1214 may be implemented by PCI Express Graphics (PEG). System agent 510 may include a direct media interface (DMI) 516. DMI 516 may provide links between different bridges on a motherboard or other portion of a computer system. System agent 510 may include a PCIe bridge 1218 for providing PCIe links to other elements of a computing system. PCIe bridge 1218 may be implemented using a memory controller 1220 and coherence logic 1222.

Cores 502 may be implemented in any suitable manner. Cores 502 may be homogenous or heterogeneous in terms of architecture and/or instruction set. In one embodiment, some of cores 502 may be in-order while others may be out-of-order. In another embodiment, two or more of cores 502 may execute the same instruction set, while others may execute only a subset of that instruction set or a different instruction set.

Processor 500 may include a general-purpose processor, such as a Core™ i3, i5, i7, 2 Duo and Quad, Xeon™, Itanium™, XScale™ or StrongARM™ processor, which may be available from Intel Corporation, of Santa Clara, Calif. Processor 500 may be provided from another company, such as ARM Holdings, Ltd, MIPS, etc. Processor 500 may be a special-purpose processor, such as, for example, a network or communication processor, compression engine, graphics processor, co-processor, embedded processor, or the like. Processor 500 may be implemented on one or more chips. Processor 500 may be a part of and/or may be implemented on one or more substrates using any of a number of process technologies, such as, for example, BiCMOS, CMOS, or NMOS.

In one embodiment, a given one of caches 506 may be shared by multiple ones of cores 502. In another embodiment, a given one of caches 506 may be dedicated to one of cores 502. The assignment of caches 506 to cores 502 may be handled by a cache controller or other suitable mechanism. A given one of caches 506 may be shared by two or more cores 502 by implementing time-slices of a given cache 506.

Graphics module 560 may implement an integrated graphics processing subsystem. In one embodiment, graphics module 560 may include a graphics processor. Furthermore, graphics module 560 may include a media engine 565. Media engine 565 may provide media encoding and video decoding.

Figure 5B:
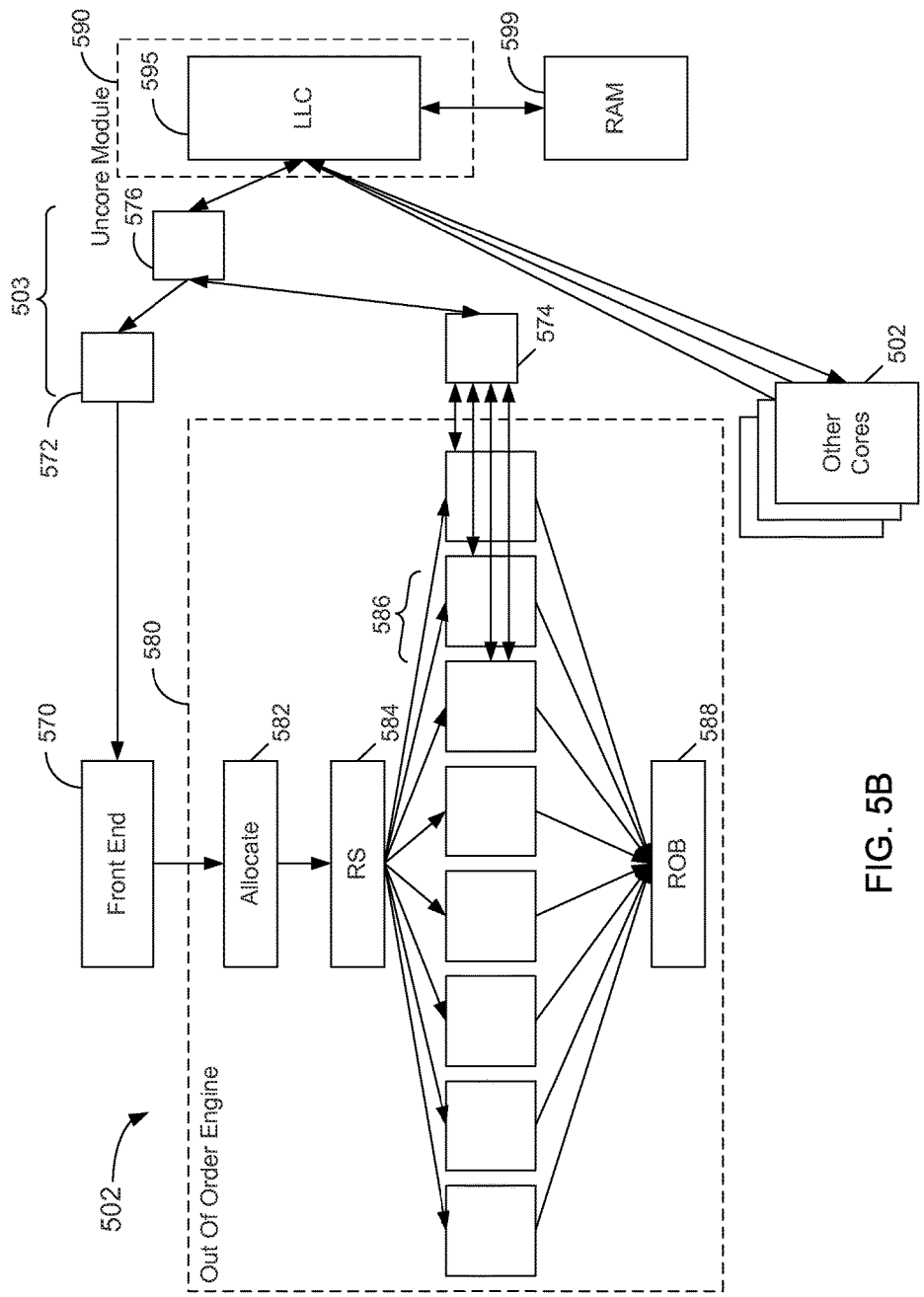
FIG. 5B is a block diagram of an example implementation of a core, in accordance with embodiments of the present disclosure.

FIG. 5B is a block diagram of an example implementation of a core 502, in accordance with embodiments of the present disclosure. Core 502 may include a front end 570 communicatively coupled to an out-of-order engine 580. Core 502 may be communicatively coupled to other portions of processor 500 through cache hierarchy 503.

Front end 570 may be implemented in any suitable manner, such as fully or in part by front end 201 as described above. In one embodiment, front end 570 may communicate with other portions of processor 500 through cache hierarchy 503. In a further embodiment, front end 570 may fetch instructions from portions of processor 500 and prepare the instructions to be used later in the processor pipeline as they are passed to out-of-order execution engine 580.

Out-of-order execution engine 580 may be implemented in any suitable manner, such as fully or in part by out-of-order execution engine 203 as described above. Out-of-order execution engine 580 may prepare instructions received from front end 570 for execution. Out-of-order execution engine 580 may include an allocate module 582. In one embodiment, allocate module 582 may allocate resources of processor 500 or other resources, such as registers or buffers, to execute a given instruction. Allocate module 582 may make allocations in schedulers, such as a memory scheduler, fast scheduler, or floating point scheduler. Such schedulers may be represented in FIG. 5B by resource schedulers 584. Allocate module 582 may be implemented fully or in part by the allocation logic described in conjunction with FIG. 2. Resource schedulers 584 may determine when an instruction is ready to execute based on the readiness of a given resource's sources and the availability of execution resources needed to execute an instruction. Resource schedulers 584 may be implemented by, for example, schedulers 202, 204, 206 as discussed above. Resource schedulers 584 may schedule the execution of instructions upon one or more resources. In one embodiment, such resources may be internal to core 502, and may be illustrated, for example, as resources 586. In another embodiment, such resources may be external to core 502 and may be accessible by, for example, cache hierarchy 503. Resources may include, for example, memory, caches, register files, or registers. Resources internal to core 502 may be represented by resources 586 in FIG. 5B. As necessary, values written to or read from resources 586 may be coordinated with other portions of processor 500 through, for example, cache hierarchy 503. As instructions are assigned resources, they may be placed into a reorder buffer 588. Reorder buffer 588 may track instructions as they are executed and may selectively reorder their execution based upon any suitable criteria of processor 500. In one embodiment, reorder buffer 588 may identify instructions or a series of instructions that may be executed independently. Such instructions or a series of instructions may be executed in parallel from other such instructions. Parallel execution in core 502 may be performed by any suitable number of separate execution blocks or virtual processors. In one embodiment, shared resources—such as memory, registers, and caches—may be accessible to multiple virtual processors within a given core 502. In other embodiments, shared resources may be accessible to multiple processing entities within processor 500.

Cache hierarchy 503 may be implemented in any suitable manner. For example, cache hierarchy 503 may include one or more lower or mid-level caches, such as caches 572, 574. In one embodiment, cache hierarchy 503 may include an LLC 595 communicatively coupled to caches 572, 574. In another embodiment, LLC 595 may be implemented in a module 590 accessible to all processing entities of processor 500. In a further embodiment, module 590 may be implemented in an uncore module of processors from Intel, Inc. Module 590 may include portions or subsystems of processor 500 necessary for the execution of core 502 but might not be implemented within core 502. Besides LLC 595, Module 590 may include, for example, hardware interfaces, memory coherency coordinators, interprocessor interconnects, instruction pipelines, or memory controllers. Access to RAM 599 available to processor 500 may be made through module 590 and, more specifically, LLC 595. Furthermore, other instances of core 502 may similarly access module 590. Coordination of the instances of core 502 may be facilitated in part through module 590.

Figure 6:
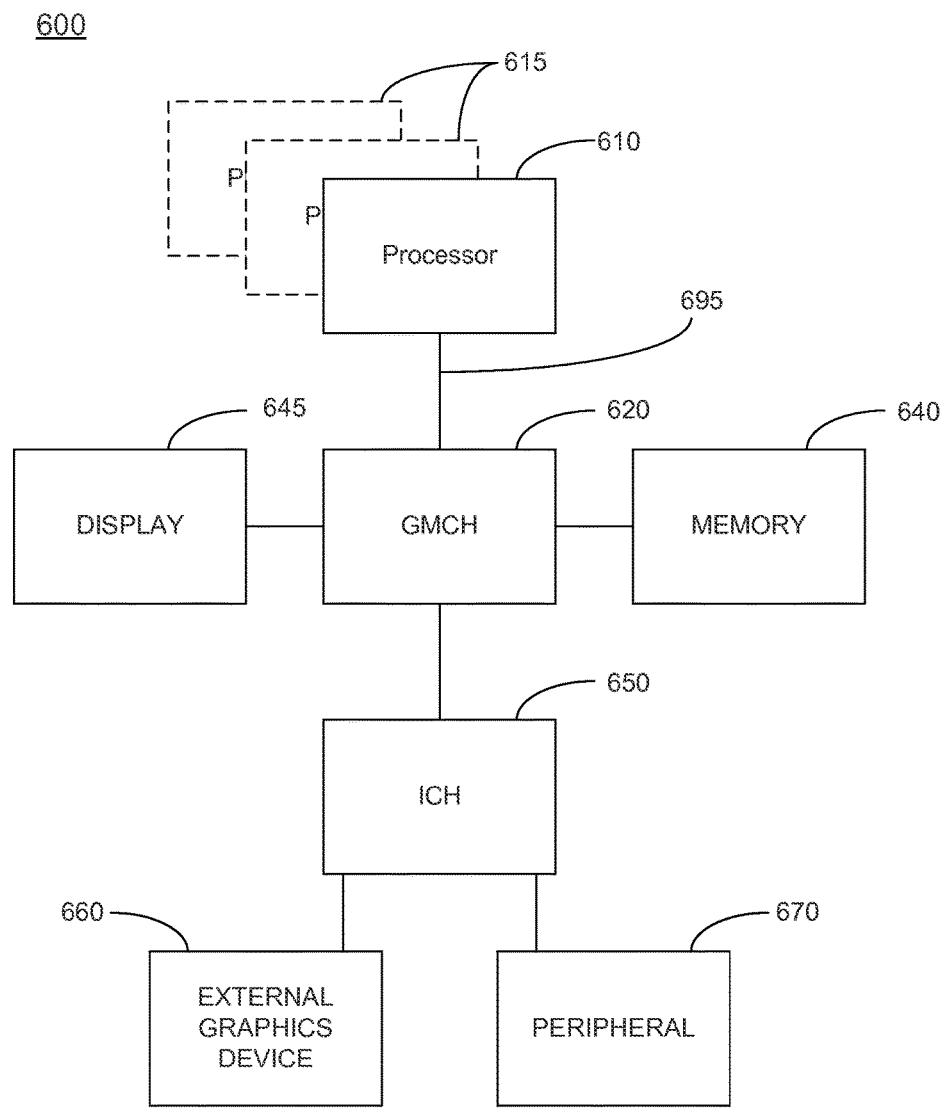
FIG. 6 is a block diagram of a system, in accordance with embodiments of the present disclosure.
Figure 7:
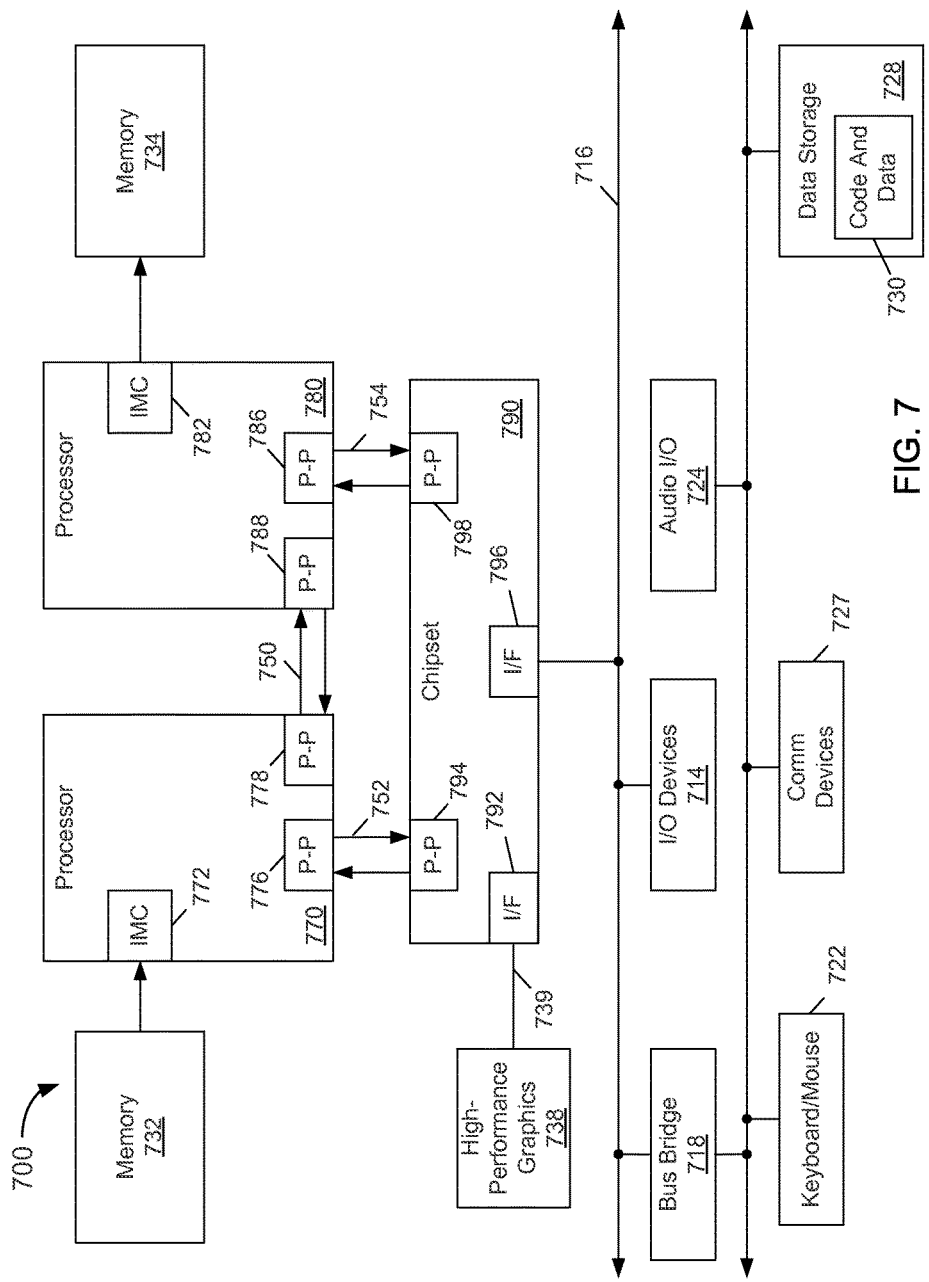
FIG. 7 is a block diagram of a second system, in accordance with embodiments of the present disclosure.
Figure 8:
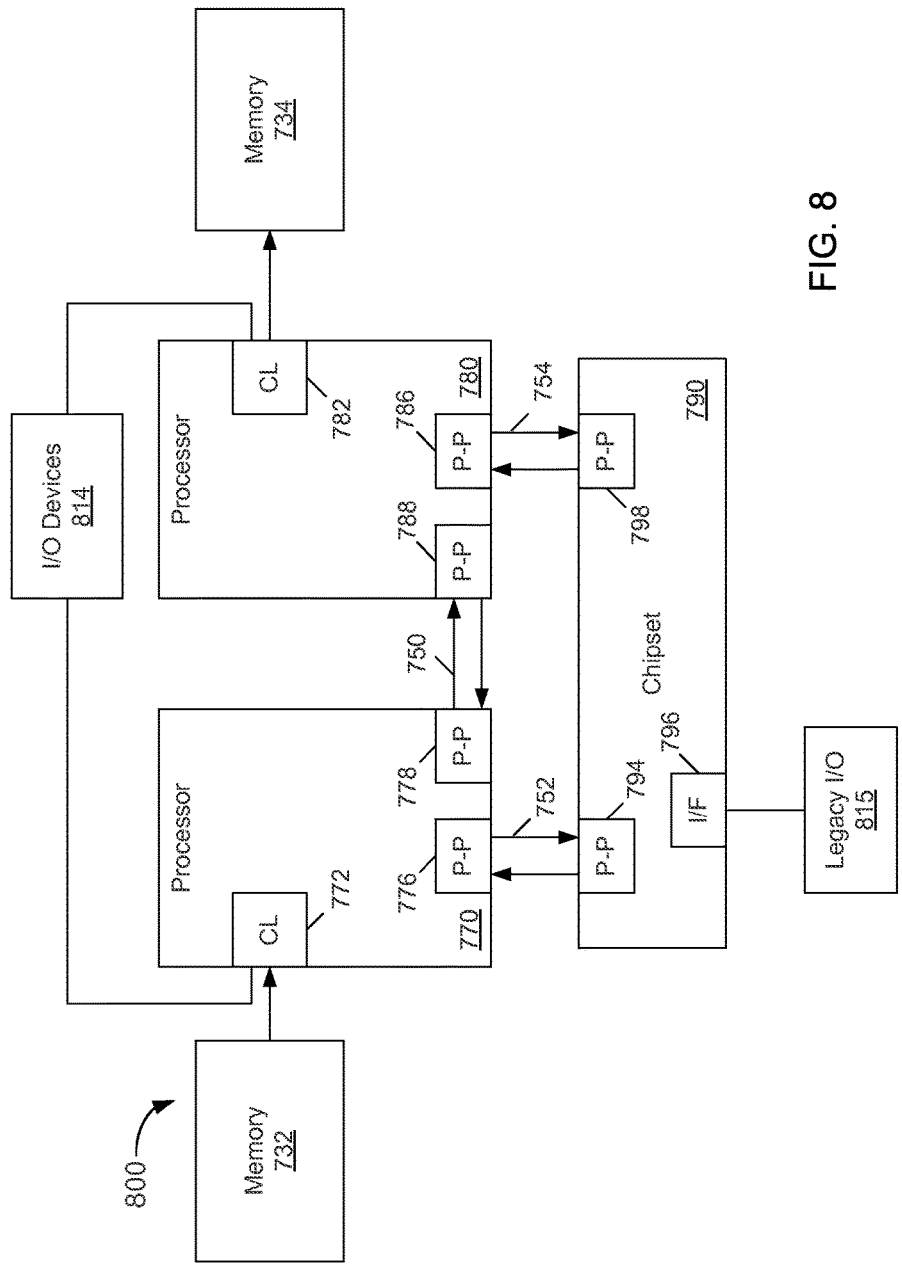
FIG. 8 is a block diagram of a third system in accordance with embodiments of the present disclosure.
Figure 9:
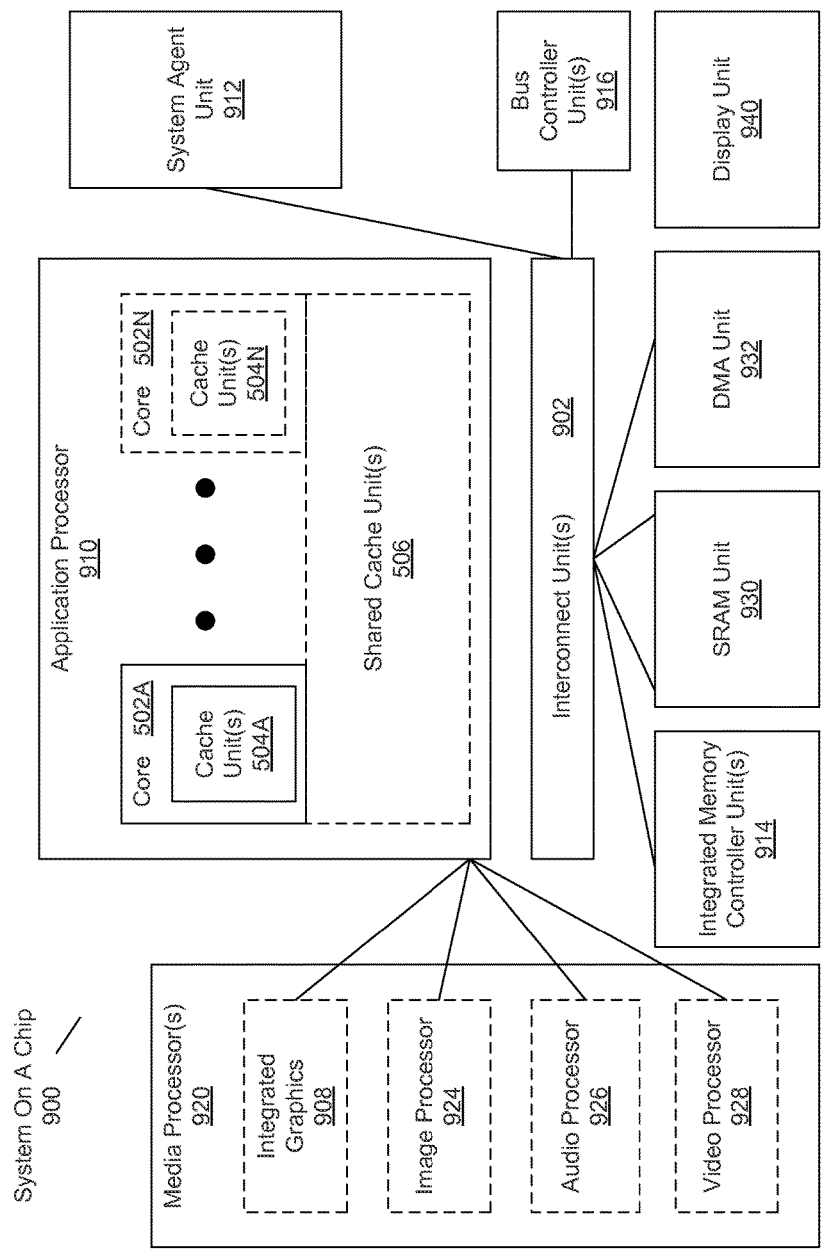
FIG. 9 is a block diagram of a system-on-a-chip, in accordance with embodiments of the present disclosure.

FIGS. 6-8 may illustrate exemplary systems suitable for including processor 500, while FIG. 9 may illustrate an exemplary system on a chip (SoC) that may include one or more of cores 502. Other system designs and implementations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, may also be suitable. In general, a huge variety of systems or electronic devices that incorporate a processor and/or other execution logic as disclosed herein may be generally suitable.

FIG. 6 illustrates a block diagram of a system 600, in accordance with embodiments of the present disclosure. System 600 may include one or more processors 610, 615, which may be coupled to graphics memory controller hub (GMCH) 620. The optional nature of additional processors 615 is denoted in FIG. 6 with broken lines.

Each processor 610,615 may be some version of processor 500. However, it should be noted that integrated graphics logic and integrated memory control units might not exist in processors 610,615. FIG. 6 illustrates that GMCH 620 may be coupled to a memory 640 that may be, for example, a dynamic random access memory (DRAM). The DRAM may, for at least one embodiment, be associated with a non-volatile cache.

GMCH 620 may be a chipset, or a portion of a chipset. GMCH 620 may communicate with processors 610, 615 and control interaction between processors 610, 615 and memory 640. GMCH 620 may also act as an accelerated bus interface between the processors 610, 615 and other elements of system 600. In one embodiment, GMCH 620 communicates with processors 610, 615 via a multi-drop bus, such as a frontside bus (FSB) 695.

Furthermore, GMCH 620 may be coupled to a display 645 (such as a flat panel display). In one embodiment, GMCH 620 may include an integrated graphics accelerator. GMCH 620 may be further coupled to an input/output (I/O) controller hub (ICH) 650, which may be used to couple various peripheral devices to system 600. External graphics device 660 may include be a discrete graphics device coupled to ICH 650 along with another peripheral device 670.

In other embodiments, additional or different processors may also be present in system 600. For example, additional processors 610, 615 may include additional processors that may be the same as processor 610, additional processors that may be heterogeneous or asymmetric to processor 610, accelerators (such as, e.g., graphics accelerators or digital signal processing (DSP) units), field programmable gate arrays, or any other processor. There may be a variety of differences between the physical resources 610, 615 in terms of a spectrum of metrics of merit including architectural, micro-architectural, thermal, power consumption characteristics, and the like. These differences may effectively manifest themselves as asymmetry and heterogeneity amongst processors 610, 615. For at least one embodiment, various processors 610, 615 may reside in the same die package.

FIG. 7 illustrates a block diagram of a second system 700, in accordance with embodiments of the present disclosure. As shown in FIG. 7, multiprocessor system 700 may include a point-to-point interconnect system, and may include a first processor 770 and a second processor 780 coupled via a point-to-point interconnect 750. Each of processors 770 and 780 may be some version of processor 500 as one or more of processors 610,615.

While FIG. 7 may illustrate two processors 770, 780, it is to be understood that the scope of the present disclosure is not so limited. In other embodiments, one or more additional processors may be present in a given processor.

Processors 770 and 780 are shown including integrated memory controller units 772 and 782, respectively. Processor 770 may also include as part of its bus controller units point-to-point (P-P) interfaces 776 and 778; similarly, second processor 780 may include P-P interfaces 786 and 788. Processors 770, 780 may exchange information via a point-to-point (P-P) interface 750 using P-P interface circuits 778, 788. As shown in FIG. 7, IMCs 772 and 782 may couple the processors to respective memories, namely a memory 732 and a memory 734, which in one embodiment may be portions of main memory locally attached to the respective processors.

Processors 770, 780 may each exchange information with a chipset 790 via individual P-P interfaces 752, 754 using point to point interface circuits 776, 794, 786, 798. In one embodiment, chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures may be possible. For example, instead of the point-to-point architecture of FIG. 7, a system may implement a multi-drop bus or other such architecture.

FIG. 8 illustrates a block diagram of a third system 700 in accordance with embodiments of the present disclosure. Like elements in FIGS. 7 and 8 bear like reference numerals, and certain aspects of FIG. 7 have been omitted from FIG. 8 in order to avoid obscuring other aspects of FIG. 8.

FIG. 8 illustrates that processors 770, 780 may include integrated memory and I/O control logic ("CL") 772 and 782, respectively. For at least one embodiment, CL 772, 782 may include integrated memory controller units such as that described above in connection with FIGS. 5 and 7. In addition. CL 772, 782 may also include I/O control logic. FIG. 8 illustrates that not only memories 732, 734 may be coupled to CL 872, 882, but also that I/O devices 814 may also be coupled to control logic 772, 782. Legacy I/O devices 815 may be coupled to chipset 790.

FIG. 9 illustrates a block diagram of a SoC 900, in accordance with embodiments of the present disclosure. Similar elements in FIG. 5 bear like reference numerals. Also, dashed lined boxes may represent optional features on more advanced SoCs. An interconnect units 902 may be coupled to: an application processor 910 which may include a set of one or more cores 502A-N and shared cache units 506; a system agent unit 912; a bus controller units 916; an integrated memory controller units 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

Figure 10:
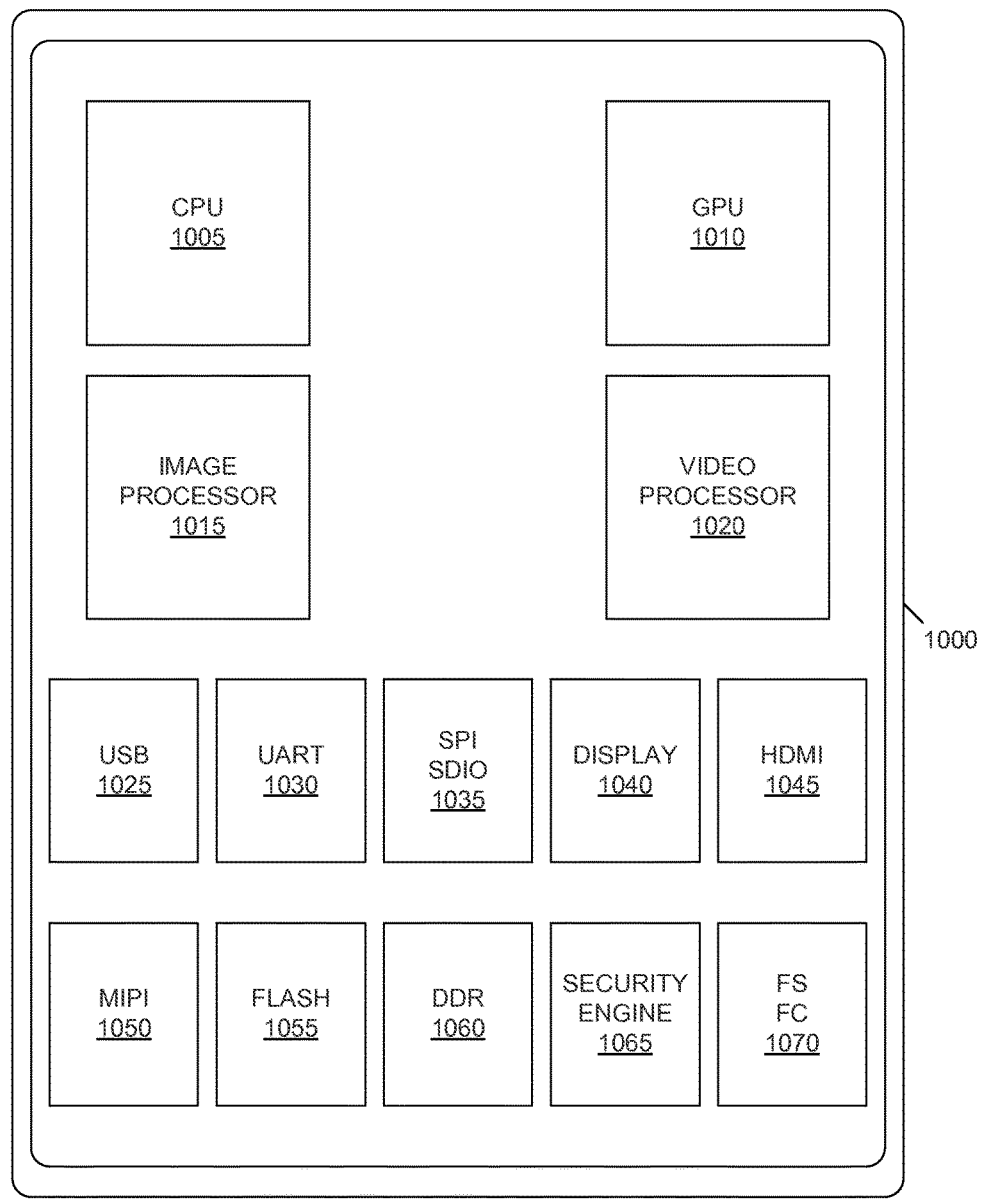
FIG. 10 illustrates a processor containing a central processing unit and a graphics processing unit which may perform at least one instruction, in accordance with embodiments of the present disclosure.

FIG. 10 illustrates a processor containing a central processing unit (CPU) and a graphics processing unit (GPU), which may perform at least one instruction, in accordance with embodiments of the present disclosure. In one embodiment, an instruction to perform operations according to at least one embodiment could be performed by the CPU. In another embodiment, the instruction could be performed by the GPU. In still another embodiment, the instruction may be performed through a combination of operations performed by the GPU and the CPU. For example, in one embodiment, an instruction in accordance with one embodiment may be received and decoded for execution on the GPU. However, one or more operations within the decoded instruction may be performed by a CPU and the result returned to the GPU for final retirement of the instruction. Conversely, in some embodiments, the CPU may act as the primary processor and the GPU as the co-processor.

In some embodiments, instructions that benefit from highly parallel, throughput processors may be performed by the GPU, while instructions that benefit from the performance of processors that benefit from deeply pipelined architectures may be performed by the CPU. For example, graphics, scientific applications, financial applications and other parallel workloads may benefit from the performance of the GPU and be executed accordingly, whereas more sequential applications, such as operating system kernel or application code may be better suited for the CPU.

In FIG. 10, processor 1000 includes a CPU 1005, GPU 1010, image processor 1015, video processor 1020, USB controller 1025, UART controller 1030, SPI/SDIO controller 1035, display device 1040, memory interface controller 1045, MIPI controller 1050, flash memory controller 1055, dual data rate (DDR) controller 1060, security engine 1065, and $I^2S/I^2C$ controller 1070. Other logic and circuits may be included in the processor of FIG. 10, including more CPUs or GPUs and other peripheral interface controllers.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine-readable medium ("tape") and supplied to various customers or manufacturing facilities to load into the fabrication machines that actually make the logic or processor. For example, IP cores, such as the Cortex™ family of processors developed by ARM Holdings, Ltd. and Loongson IP cores developed the Institute of Computing Technology (ICT) of the Chinese Academy of Sciences may be licensed or sold to various customers or licensees, such as Texas Instruments, Qualcomm, Apple, or Samsung and implemented in processors produced by these customers or licensees.

Figure 11:
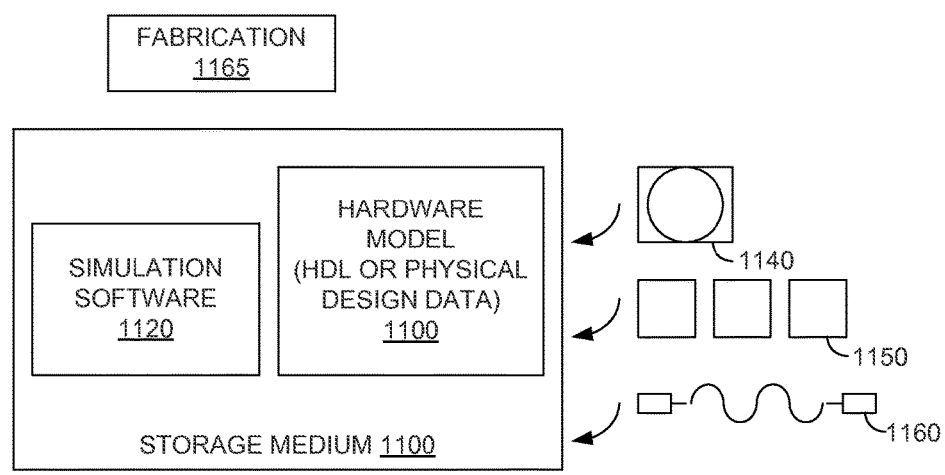
FIG. 11 is a block diagram illustrating the development of IP cores, in accordance with embodiments of the present disclosure.

FIG. 11 illustrates a block diagram illustrating the development of IP cores, in accordance with embodiments of the present disclosure. Storage 1130 may include simulation software 1120 and/or hardware or software model 1110. In one embodiment, the data representing the IP core design may be provided to storage 1130 via memory 1140 (e.g., hard disk), wired connection (e.g., internet) 1150 or wireless connection 1160. The IP core information generated by the simulation tool and model may then be transmitted to a fabrication facility where it may be fabricated by a $3^{rd}$ party to perform at least one instruction in accordance with at least one embodiment.

In some embodiments, one or more instructions may correspond to a first type or architecture (e.g., x86) and be translated or emulated on a processor of a different type or architecture (e.g., ARM). An instruction, according to one embodiment, may therefore be performed on any processor or processor type, including ARM, x86, MIPS, a GPU, or other processor type or architecture.

Figure 12:
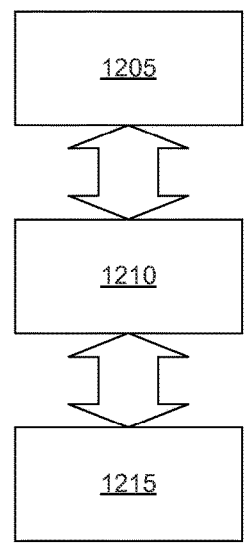
FIG. 12 illustrates how an instruction of a first type may be emulated by a processor of a different type, in accordance with embodiments of the present disclosure.

FIG. 12 illustrates how an instruction of a first type may be emulated by a processor of a different type, in accordance with embodiments of the present disclosure. In FIG. 12, program 1205 contains some instructions that may perform the same or substantially the same function as an instruction according to one embodiment. However the instructions of program 1205 may be of a type and/or format that is different from or incompatible with processor 1215, meaning the instructions of the type in program 1205 may not be able to execute natively by the processor 1215. However, with the help of emulation logic, 1210, the instructions of program 1205 may be translated into instructions that may be natively be executed by the processor 1215. In one embodiment, the emulation logic may be embodied in hardware. In another embodiment, the emulation logic may be embodied in a tangible, machine-readable medium containing software to translate instructions of the type in program 1205 into the type natively executable by processor 1215. In other embodiments, emulation logic may be a combination of fixed-function or programmable hardware and a program stored on a tangible, machine-readable medium. In one embodiment, the processor contains the emulation logic, whereas in other embodiments, the emulation logic exists outside of the processor and may be provided by a third party. In one embodiment, the processor may load the emulation logic embodied in a tangible, machine-readable medium containing software by executing microcode or firmware contained in or associated with the processor.

Figure 13:
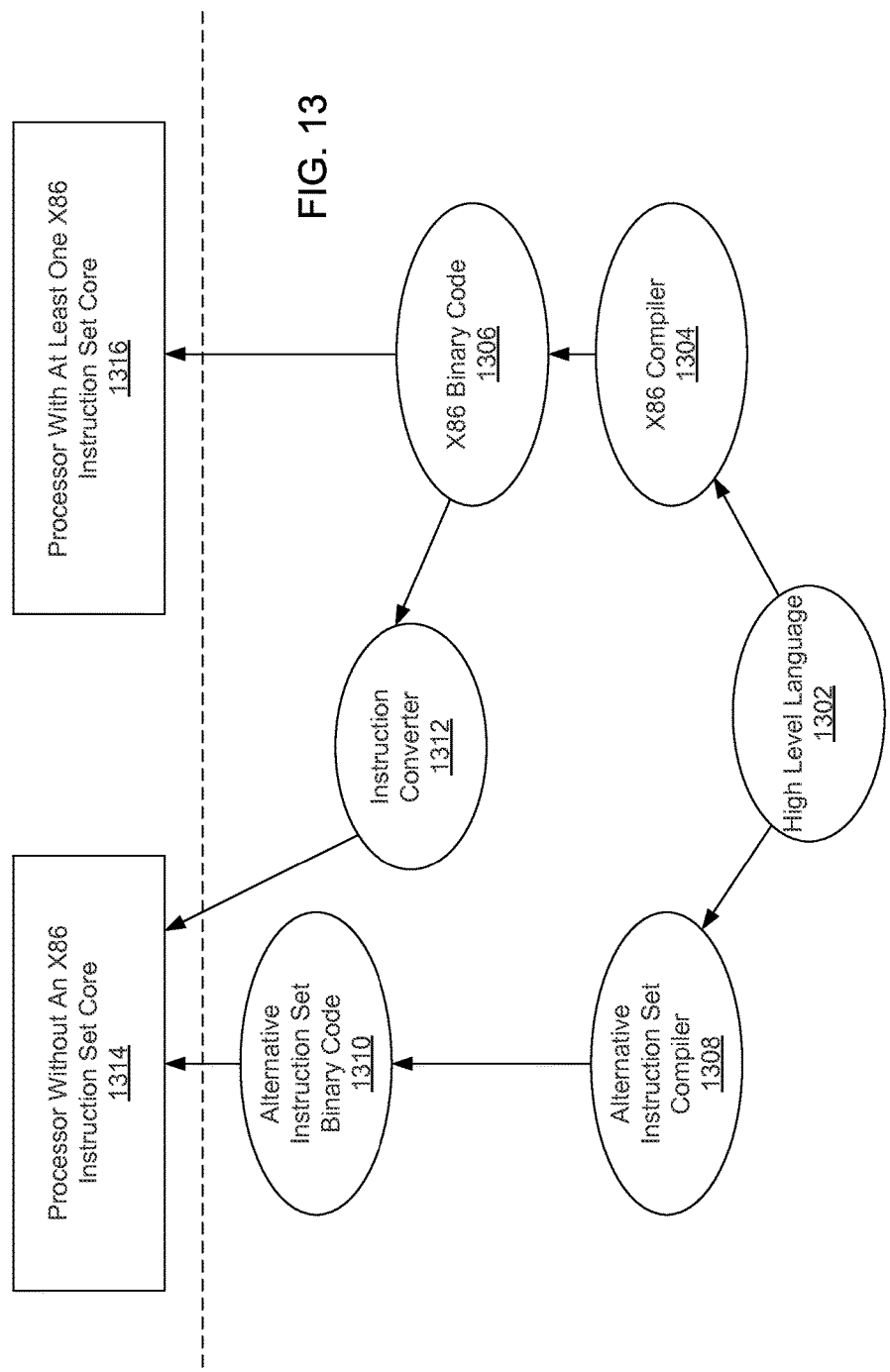
FIG. 13 illustrates a block diagram contrasting the use of a software instruction converter to convert binary instructions in a source instruction set to binary instructions in a target instruction set, in accordance with embodiments of the present disclosure.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, FIG. 13 shows the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.).

The instruction converter 1312 is used to convert the x86 binary code 1306 into alternative instruction set binary code 1311 that may be natively executed by the processor without an x86 instruction set core 1314. This converted code may or may not be the same as the alternative instruction set binary code 1310 resulting from an alternative instruction set compiler 1308; however, the converted code will accomplish the same general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

Figure 14:
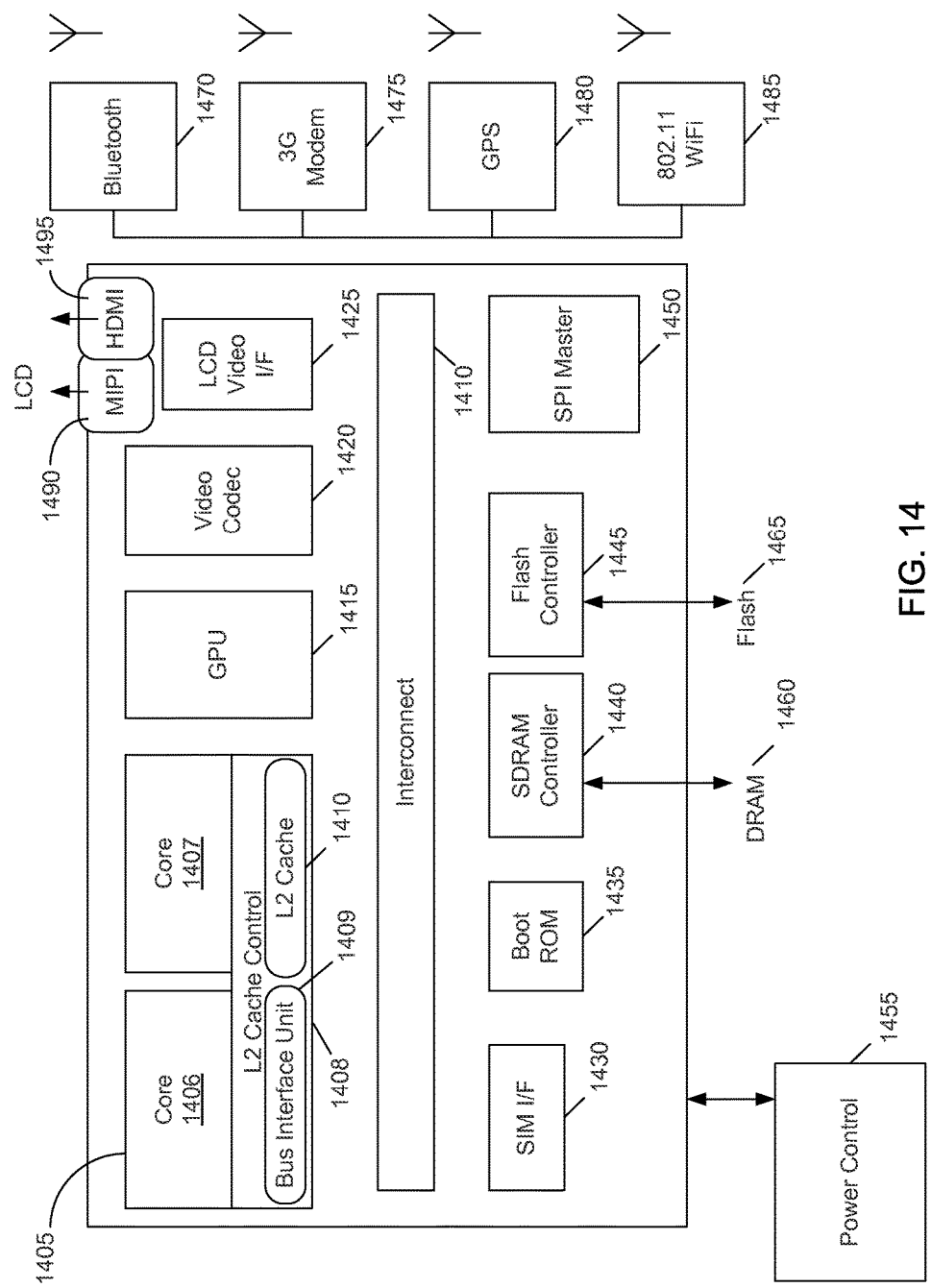
FIG. 14 is a block diagram of an instruction set architecture of a processor, in accordance with embodiments of the present disclosure.

FIG. 14 is a block diagram of an instruction set architecture 1400 of a processor, in accordance with embodiments of the present disclosure. Instruction set architecture 1400 may include any suitable number or kind of components.

For example, instruction set architecture 1400 may include processing entities such as one or more cores 1406, 1407 and a graphics processing unit 1415. Cores 1406, 1407 may be communicatively coupled to the rest of instruction set architecture 1400 through any suitable mechanism, such as through a bus or cache. In one embodiment, cores 1406, 1407 may be communicatively coupled through an L2 cache control 1408, which may include a bus interface unit 1409 and an L2 cache 1410. Cores 1406, 1407 and graphics processing unit 1415 may be communicatively coupled to each other and to the remainder of instruction set architecture 1400 through interconnect 1410. In one embodiment, graphics processing unit 1415 may use a video code 1420 defining the manner in which particular video signals will be encoded and decoded for output.

Instruction set architecture 1400 may also include any number or kind of interfaces, controllers, or other mechanisms for interfacing or communicating with other portions of an electronic device or system. Such mechanisms may facilitate interaction with, for example, peripherals, communications devices, other processors, or memory. In the example of FIG. 14, instruction set architecture 1400 may include a liquid crystal display (LCD) video interface 1425, a subscriber interface module (SIM) interface 1430, a boot ROM interface 1435, a synchronous dynamic random access memory (SDRAM) controller 1440, a flash controller 1445, and a serial peripheral interface (SPI) master unit 1450. LCD video interface 1425 may provide output of video signals from, for example, GPU 1415 and through, for example, a mobile industry processor interface (MIPI) 1490 or a high-definition multimedia interface (HDMI) 1495 to a display. Such a display may include, for example, an LCD. SIM interface 1430 may provide access to or from a SIM card or device. SDRAM controller 1440 may provide access to or from memory such as an SDRAM chip or module. Flash controller 1445 may provide access to or from memory such as flash memory or other instances of RAM. SPI master unit 1450 may provide access to or from communications modules, such as a Bluetooth module 1470, high-speed 3G modem 1475, global positioning system module 1480, or wireless module 1485 implementing a communications standard such as 802.11.

Figure 15:
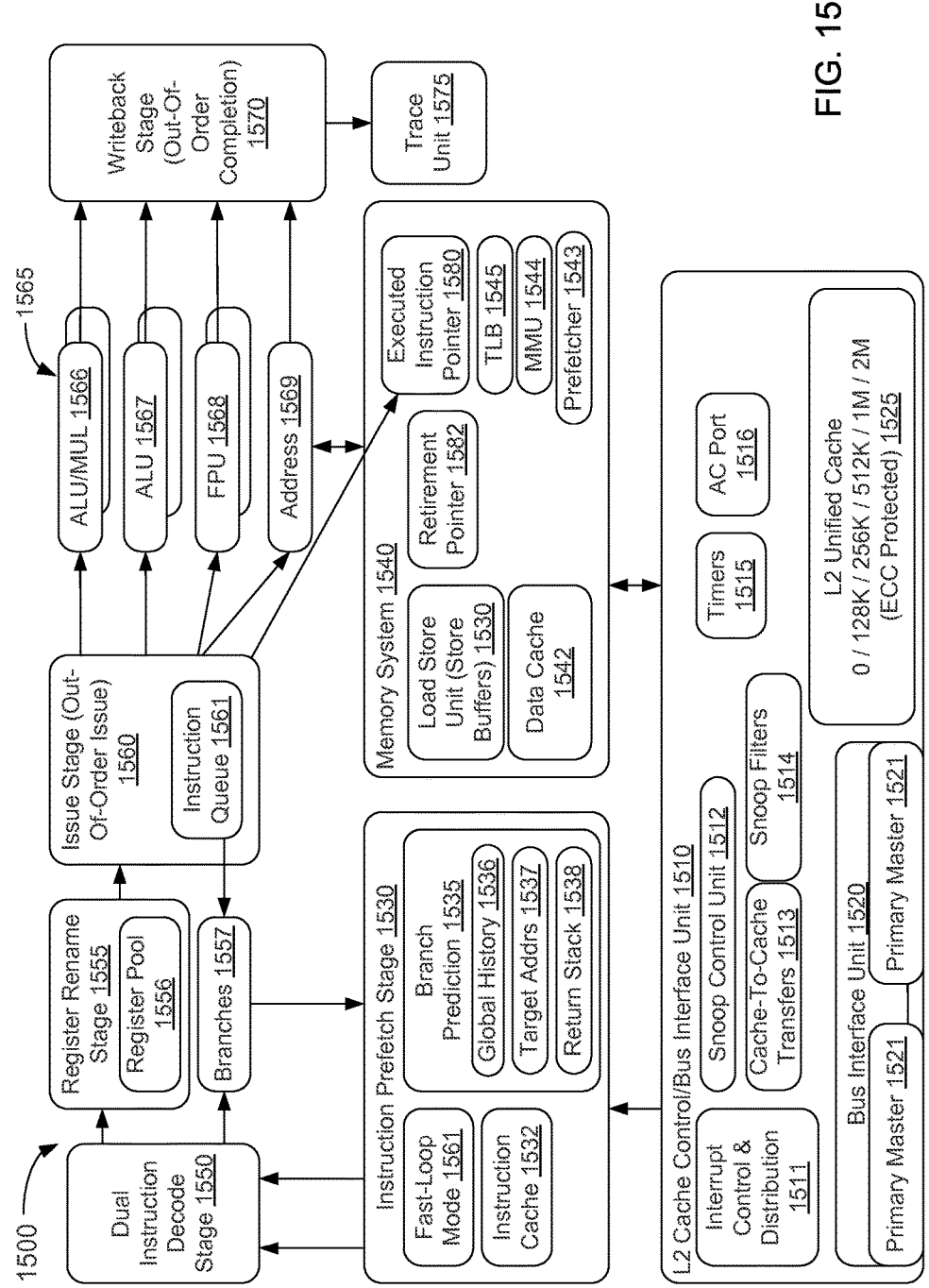
FIG. 15 is a more detailed block diagram of an instruction set architecture of a processor, in accordance with embodiments of the present disclosure.

FIG. 15 is a more detailed block diagram of an instruction set architecture 1500 of a processor, in accordance with embodiments of the present disclosure. Instruction architecture 1500 may implement one or more aspects of instruction set architecture 1400. Furthermore, instruction set architecture 1500 may illustrate modules and mechanisms for the execution of instructions within a processor.

Instruction architecture 1500 may include a memory system 1540 communicatively coupled to one or more execution entities 1565. Furthermore, instruction architecture 1500 may include a caching and bus interface unit such as unit 1510 communicatively coupled to execution entities 1565 and memory system 1540. In one embodiment, loading of instructions into execution entities 1564 may be performed by one or more stages of execution. Such stages may include, for example, instruction prefetch stage 1530, dual instruction decode stage 1550, register rename stage 155, issue stage 1560, and writeback stage 1570.

In another embodiment, memory system 1540 may include a retirement pointer 1582. Retirement pointer 1582 may store a value identifying the program order (PO) of the last retired instruction. Retirement pointer 1582 may be set by, for example, retirement unit 454. If no instructions have yet been retired, retirement pointer 1582 may include a null value.

Execution entities 1565 may include any suitable number and kind of mechanisms by which a processor may execute instructions. In the example of FIG. 15, execution entities 1565 may include ALU/multiplication units (MUL) 1566, ALUs 1567, and floating point units (FPU) 1568. In one embodiment, such entities may make use of information contained within a given address 1569. Execution entities 1565 in combination with stages 1530, 1550, 1555, 1560, 1570 may collectively form an execution unit.

Unit 1510 may be implemented in any suitable manner. In one embodiment, unit 1510 may perform cache control. In such an embodiment, unit 1510 may thus include a cache 1525. Cache 1525 may be implemented, in a further embodiment, as an L2 unified cache with any suitable size, such as zero, 128 k, 256 k, 512 k, 1M, or 2M bytes of memory. In another, further embodiment, cache 1525 may be implemented in error-correcting code memory. In another embodiment, unit 1510 may perform bus interfacing to other portions of a processor or electronic device. In such an embodiment, unit 1510 may thus include a bus interface unit 1520 for communicating over an interconnect, intraprocessor bus, interprocessor bus, or other communication bus, port, or line. Bus interface unit 1520 may provide interfacing in order to perform, for example, generation of the memory and input/output addresses for the transfer of data between execution entities 1565 and the portions of a system external to instruction architecture 1500.

To further facilitate its functions, bus interface unit 1520 may include an interrupt control and distribution unit 1511 for generating interrupts and other communications to other portions of a processor or electronic device. In one embodiment, bus interface unit 1520 may include a snoop control unit 1512 that handles cache access and coherency for multiple processing cores. In a further embodiment, to provide such functionality, snoop control unit 1512 may include a cache-to-cache transfer unit that handles information exchanges between different caches. In another, further embodiment, snoop control unit 1512 may include one or more snoop filters 1514 that monitors the coherency of other caches (not shown) so that a cache controller, such as unit 1510, does not have to perform such monitoring directly. Unit 1510 may include any suitable number of timers 1515 for synchronizing the actions of instruction architecture 1500. Also, unit 1510 may include an AC port 1516.

Memory system 1540 may include any suitable number and kind of mechanisms for storing information for the processing needs of instruction architecture 1500. In one embodiment, memory system 1504 may include a load store unit 1530 for storing information such as buffers written to or read back from memory or registers. In another embodiment, memory system 1504 may include a translation lookaside buffer (TLB) 1545 that provides look-up of address values between physical and virtual addresses. In yet another embodiment, bus interface unit 1520 may include a memory management unit (MMU) 1544 for facilitating access to virtual memory. In still yet another embodiment, memory system 1504 may include a prefetcher 1543 for requesting instructions from memory before such instructions are actually needed to be executed, in order to reduce latency.

The operation of instruction architecture 1500 to execute an instruction may be performed through different stages. For example, using unit 1510 instruction prefetch stage 1530 may access an instruction through prefetcher 1543. Instructions retrieved may be stored in instruction cache 1532. Prefetch stage 1530 may enable an option 1531 for fast-loop mode, wherein a series of instructions forming a loop that is small enough to fit within a given cache are executed. In one embodiment, such an execution may be performed without needing to access additional instructions from, for example, instruction cache 1532. Determination of what instructions to prefetch may be made by, for example, branch prediction unit 1535, which may access indications of execution in global history 1536, indications of target addresses 1537, or contents of a return stack 1538 to determine which of branches 1557 of code will be executed next. Such branches may be possibly prefetched as a result. Branches 1557 may be produced through other stages of operation as described below. Instruction prefetch stage 1530 may provide instructions as well as any predictions about future instructions to dual instruction decode stage.

Dual instruction decode stage 1550 may translate a received instruction into microcode-based instructions that may be executed. Dual instruction decode stage 1550 may simultaneously decode two instructions per clock cycle. Furthermore, dual instruction decode stage 1550 may pass its results to register rename stage 1555. In addition, dual instruction decode stage 1550 may determine any resulting branches from its decoding and eventual execution of the microcode. Such results may be input into branches 1557.

Register rename stage 1555 may translate references to virtual registers or other resources into references to physical registers or resources. Register rename stage 1555 may include indications of such mapping in a register pool 1556. Register rename stage 1555 may alter the instructions as received and send the result to issue stage 1560.

Issue stage 1560 may issue or dispatch commands to execution entities 1565. Such issuance may be performed in an out-of-order fashion. In one embodiment, multiple instructions may be held at issue stage 1560 before being executed. Issue stage 1560 may include an instruction queue 1561 for holding such multiple commands. Instructions may be issued by issue stage 1560 to a particular processing entity 1565 based upon any acceptable criteria, such as availability or suitability of resources for execution of a given instruction. In one embodiment, issue stage 1560 may reorder the instructions within instruction queue 1561 such that the first instructions received might not be the first instructions executed. Based upon the ordering of instruction queue 1561, additional branching information may be provided to branches 1557. Issue stage 1560 may pass instructions to executing entities 1565 for execution.

Upon execution, writeback stage 1570 may write data into registers, queues, or other structures of instruction set architecture 1500 to communicate the completion of a given command. Depending upon the order of instructions arranged in issue stage 1560, the operation of writeback stage 1570 may enable additional instructions to be executed. Performance of instruction set architecture 1500 may be monitored or debugged by trace unit 1575.

Figure 16:
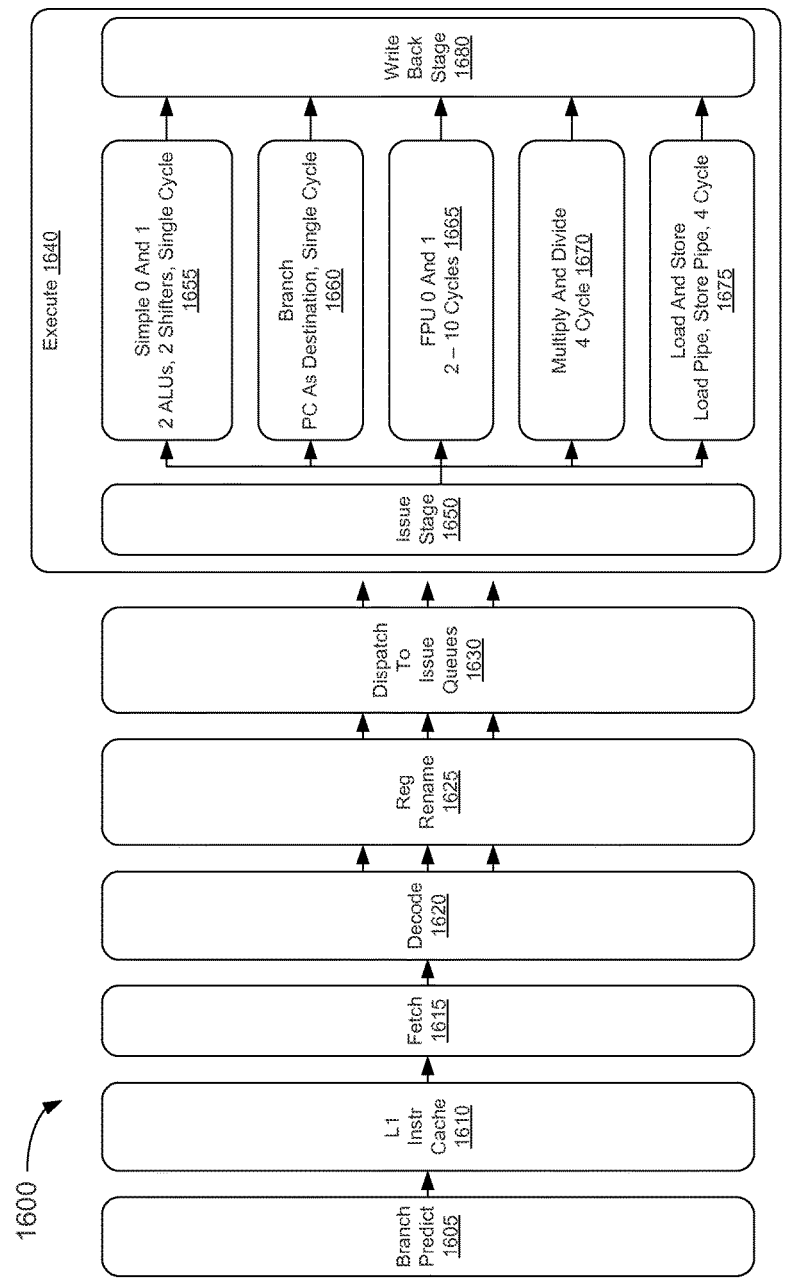
FIG. 16 is a block diagram of an execution pipeline for an instruction set architecture of a processor, in accordance with embodiments of the present disclosure.

FIG. 16 is a block diagram of an execution pipeline 1600 for an instruction set architecture of a processor, in accordance with embodiments of the present disclosure. Execution pipeline 1600 may illustrate operation of, for example, instruction architecture 1500 of FIG. 15.

Execution pipeline 1600 may include any suitable combination of steps or operations. In 1605, predictions of the branch that is to be executed next may be made. In one embodiment, such predictions may be based upon previous executions of instructions and the results thereof. In 1610, instructions corresponding to the predicted branch of execution may be loaded into an instruction cache. In 1615, one or more such instructions in the instruction cache may be fetched for execution. In 1620, the instructions that have been fetched may be decoded into microcode or more specific machine language. In one embodiment, multiple instructions may be simultaneously decoded. In 1625, references to registers or other resources within the decoded instructions may be reassigned. For example, references to virtual registers may be replaced with references to corresponding physical registers. In 1630, the instructions may be dispatched to queues for execution. In 1640, the instructions may be executed. Such execution may be performed in any suitable manner. In 1650, the instructions may be issued to a suitable execution entity. The manner in which the instruction is executed may depend upon the specific entity executing the instruction. For example, at 1655, an ALU may perform arithmetic functions. The ALU may utilize a single clock cycle for its operation, as well as two shifters. In one embodiment, two ALUs may be employed, and thus two instructions may be executed at 1655. At 1660, a determination of a resulting branch may be made. A program counter may be used to designate the destination to which the branch will be made. 1660 may be executed within a single clock cycle. At 1665, floating point arithmetic may be performed by one or more FPUs. The floating point operation may require multiple clock cycles to execute, such as two to ten cycles. At 1670, multiplication and division operations may be performed. Such operations may be performed in four clock cycles. At 1675, loading and storing operations to registers or other portions of pipeline 1600 may be performed. The operations may include loading and storing addresses. Such operations may be performed in four clock cycles. At 1680, write-back operations may be performed as required by the resulting operations of 1655-1675.

Figure 17:
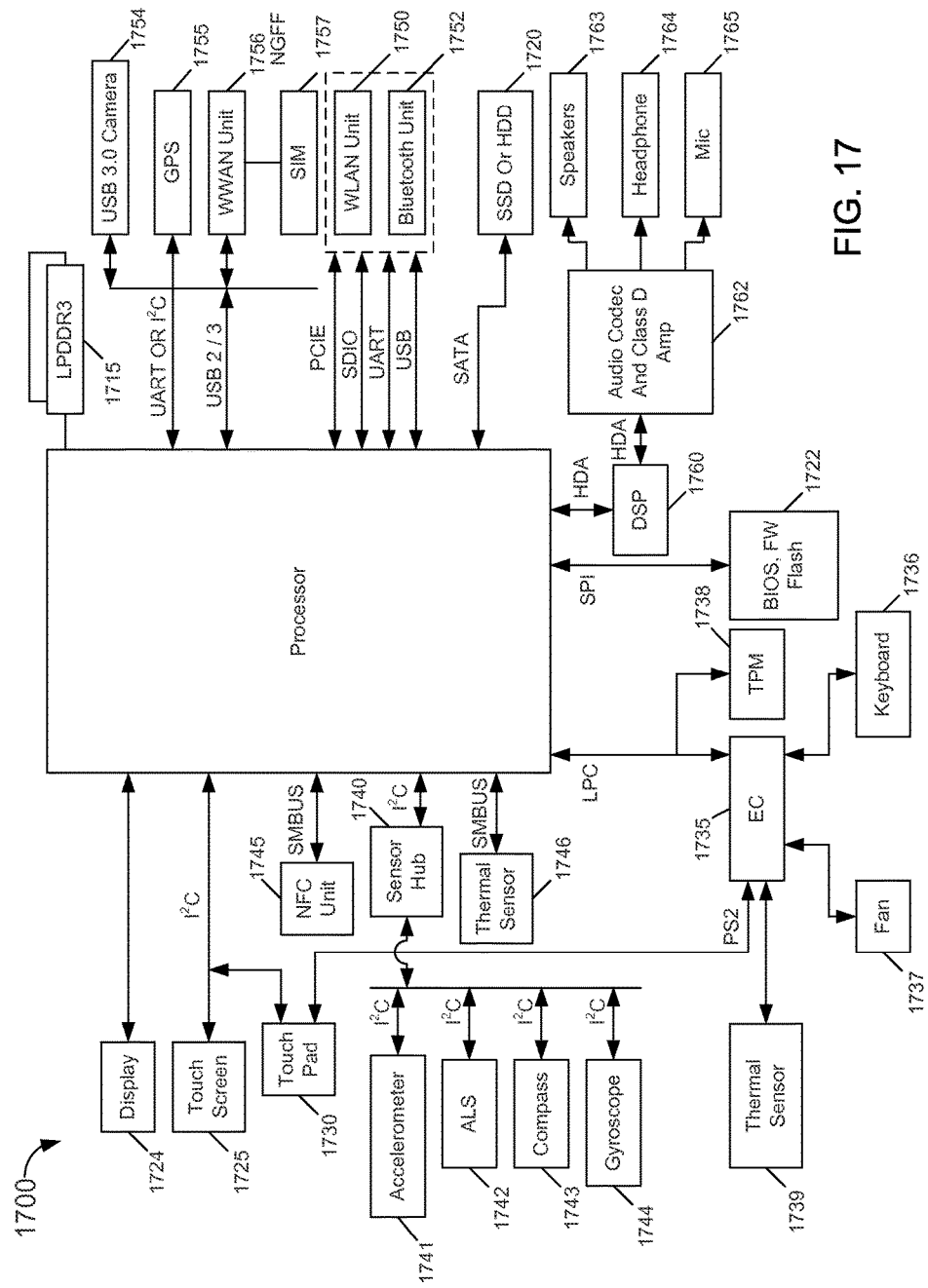
FIG. 17 is a block diagram of an electronic device for utilizing a processor, in accordance with embodiments of the present disclosure.

FIG. 17 is a block diagram of an electronic device 1700 for utilizing a processor 1710, in accordance with embodiments of the present disclosure. Electronic device 1700 may include, for example, a notebook, an ultrabook, a computer, a tower server, a rack server, a blade server, a laptop, a desktop, a tablet, a mobile device, a phone, an embedded computer, or any other suitable electronic device.

Electronic device 1700 may include processor 1710 communicatively coupled to any suitable number or kind of components, peripherals, modules, or devices. Such coupling may be accomplished by any suitable kind of bus or interface, such as I²C bus, system management bus (SMBus), low pin count (LPC) bus, SPI, high definition audio (HDA) bus, Serial Advance Technology Attachment (SATA) bus, USB bus (versions 1, 2, 3), or Universal Asynchronous Receiver/Transmitter (UART) bus.

Such components may include, for example, a display 1724, a touch screen 1725, a touch pad 1730, a near field communications (NFC) unit 1745, a sensor hub 1740, a thermal sensor 1746, an express chipset (EC) 1735, a trusted platform module (TPM) 1738, BIOS/firmware/flash memory 1722, a digital signal processor 1760, a drive 1720 such as a solid state disk (SSD) or a hard disk drive (HDD), a wireless local area network (WLAN) unit 1750, a Bluetooth unit 1752, a wireless wide area network (WWAN) unit 1756, a global positioning system (GPS), a camera 1754 such as a USB 3.0 camera, or a low power double data rate (LPDDR) memory unit 1715 implemented in, for example, the LPDDR3 standard. These components may each be implemented in any suitable manner.

Furthermore, in various embodiments other components may be communicatively coupled to processor 1710 through the components discussed above. For example, an accelerometer 1741, ambient light sensor (ALS) 1742, compass 1743, and gyroscope 1744 may be communicatively coupled to sensor hub 1740. A thermal sensor 1739, fan 1737, keyboard 1746, and touch pad 1730 may be communicatively coupled to EC 1735. Speaker 1763, headphones 1764, and a microphone 1765 may be communicatively coupled to an audio unit 1764, which may in turn be communicatively coupled to DSP 1760. Audio unit 1764 may include, for example, an audio codec and a class D amplifier. A SIM card 1757 may be communicatively coupled to WWAN unit 1756. Components such as WLAN unit 1750 and Bluetooth unit 1752, as well as WWAN unit 1756 may be implemented in a next generation form factor (NGFF).

In some cases, a software utility that uses an instruction in accordance with an embodiment can have a different application programming interface (API) than a bit mask. For instance, that utility can just accept a percentage and use the correct bit mask as the argument to this instruction.

Figure 18:
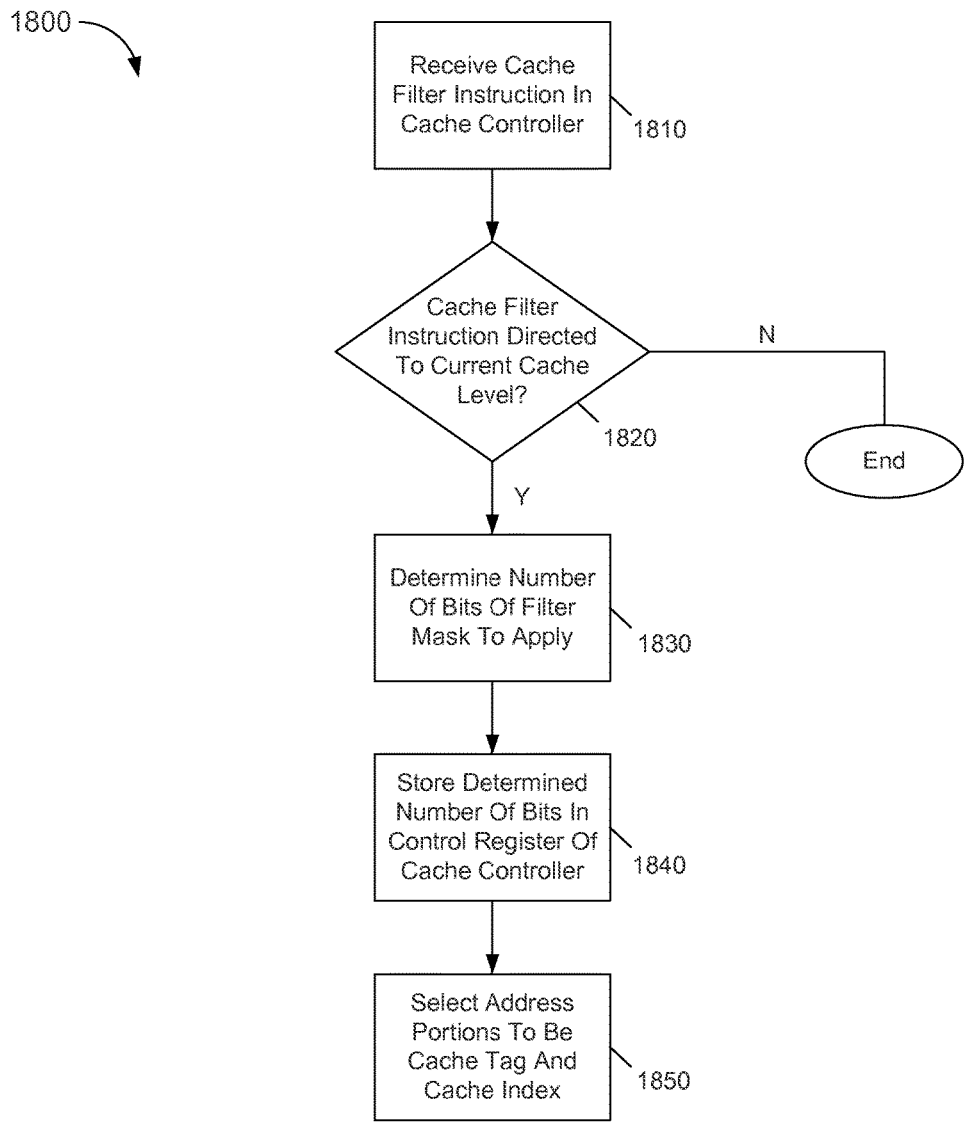
FIG. 18 is a flow diagram of a method in accordance with an embodiment of the present invention.

Referring now to FIG. 18, shown is a flow diagram of a method in accordance with an embodiment of the present invention. More specifically, method 1800 shown in FIG. 18 may be performed by control logic of a cache controller of one or more cache memories in a memory hierarchy. In different embodiments, such cache controller may be implemented as a combination of hardware circuitry, software, and/or firmware. Such control logic of a cache controller may include control registers, computation logic such as one or more arithmetic logic units, communication circuitry and memory access circuitry, in addition to various tables and other control logic. While described herein in the context of a cache controller, understand that control logic configured to perform method 1800 also may be present in one or more agents associated with a directory structure, such as a distributed directory implemented, e.g., at least in part by caching home agents, caching agents and/or home agents associated with various cores or other processing units of a processor. Note further that as described herein, a cache memory may be any level of a memory hierarchy, including a memory-side cache memory implemented in a processor package with one or more other die that form a multi-die/multi-core processor.

As shown in FIG. 18, method 1800 begins by receiving a cache filter instruction in a cache controller (block 1810). As an example, this instruction may be received in a privileged mode, e.g., from an OS or other supervisor software, to configure a given cache memory to perform the cache filtering described herein. Assume for purposes of discussion that this cache filter instruction is received prior to initiation of an application to be executed on a processor that has a large working set (e.g., at least as large as and possibly much larger than the size of the cache memory).

Next, control passes to diamond 1820 where it is determined whether the cache filter instruction is directed to the current cache level. In an embodiment, this determination may be based on a cache field of the instruction, which may provide an encoding to indicate the cache level for which the instruction is directed. In other cases, such field is optional, and the determination of diamond 1820 similarly would be optional.

Still with reference to FIG. 18, assuming that the cache filter instruction is directed to the current cache level, control passes to block 1830 where a number of bits of a filter mask to apply can be determined. This determination may be based on another field of the instruction to indicate the number of bits to apply for filtering. As an example, a three-bit field can encode 8 granularities of filtering (e.g., from 12.5% to 100%). Next at block 1840 the determined number of bits may be stored in a control register of the cache controller. More specifically, a data field of the instruction provides a filter value to indicate which bits of memory addresses are to have a predetermined value (e.g., a one value) to enable cache eligibility. Note that in other cases, a logic 0 may be used to encode the bits of a memory address to be used to determine cache eligibility. Finally control passes to block 1850 where the cache controller may select the address portions to be used as a cache tag and a cache index. In one example embodiment, assume filter bits are bits 6-8 of an address, and bits 0-5 (LSBs) correspond to byte locations within a cache line. In such implementation, bits higher than 6 (which are not considered in the filter analysis) may act as cache index bits, and other bits, including the filter bits, may be used as cache tag bits. Understand while shown at this high level in the embodiment of FIG. 18, many variations and alternatives are possible.

Figure 19:
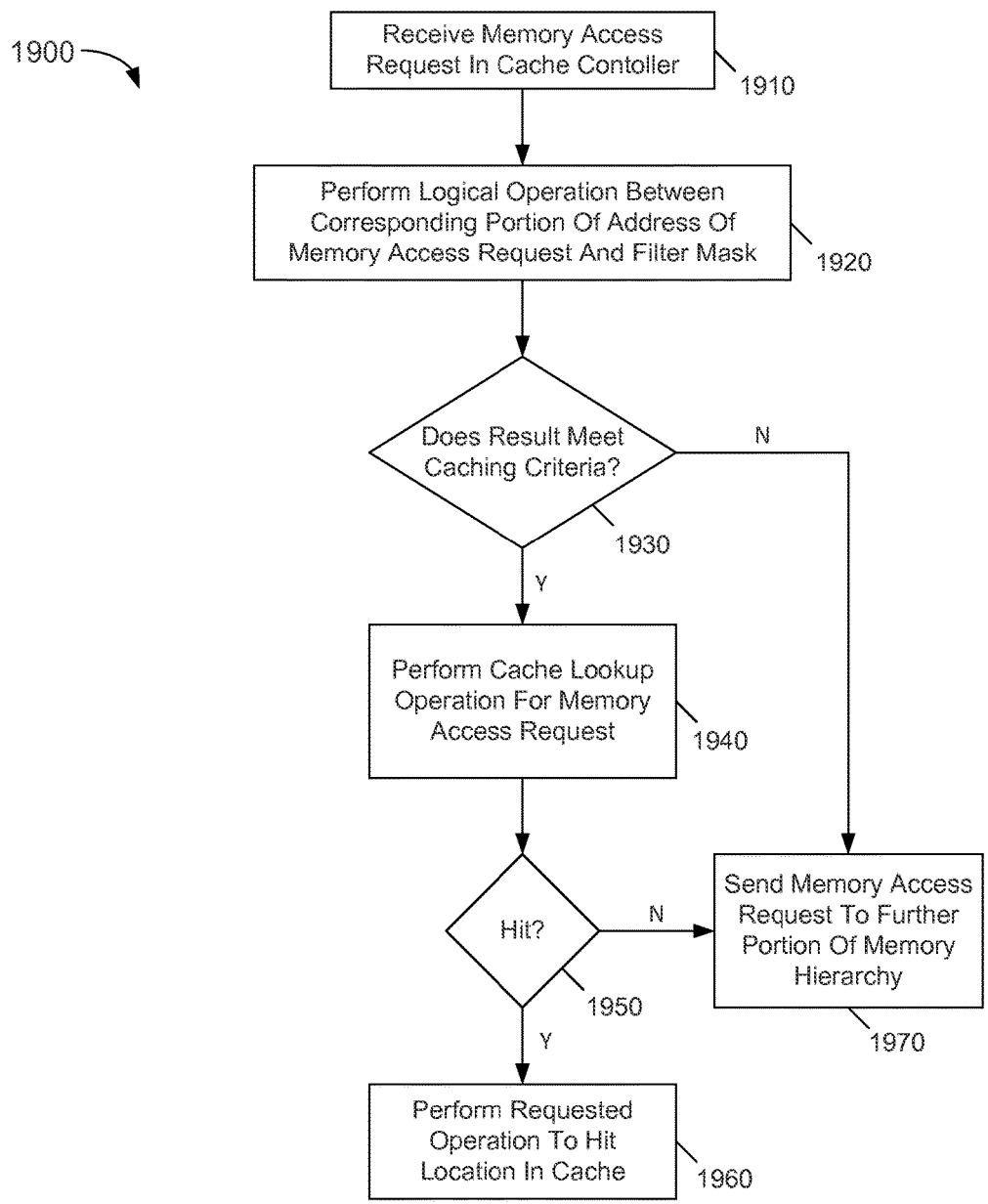
FIG. 19 is a block diagram of a method in accordance with another embodiment of the present invention.

Referring now to FIG. 19, shown is a block diagram of a method in accordance with another embodiment of the present invention. More specifically, method 1900 shown in FIG. 19 may be performed by control logic of a cache controller of one or more cache memories in a memory hierarchy.

As illustrated, method 1900 begins by receiving a memory access request in a cache controller (diamond 1910). As examples, this memory access request may be a read or write request, responsive to a load or store instruction, respectively. Next at block 1920 a logical operation is performed. More specifically, this logical operation, which in an embodiment may be a logical AND, occurs between a portion of the address of the memory access request and the filter mask stored in the control register. Note that this address of the memory access request may be a physical address, as any translation from a virtual address to a physical address has already occurred. In other embodiments, another type of logical operation, such as a logical OR, exclusive-OR operation, a table lookup or so forth instead may occur.

Still referring to FIG. 19, next at diamond 1930 it is determined whether the result of this logical operation meets a caching criteria. Although different types of caching criteria may be present in various embodiments, in an example in which the logical operation is an AND operation, and the bit mask has a logic 1 value to indicate address bits for which caching is to be allowed, this caching criteria may be a non-zero result of the logical operation. If the result of the logical operation meets the caching criteria, control passes to block 1940 where a cache lookup operation may be performed in the cache memory for the memory access request. Thus it is determined at diamond 1950 whether the address of the memory access request hits in the cache. If so, the requested operation may be performed to the hit location (block 1960). Thus for a read request, the data stored in the requested location may be accessed and provided to the requester. And if a write operation, the requested data may be written to the corresponding location in the cache memory.

Note from both of diamonds 1930 and 1950 if the determination is in the negative, control passes to block 1970. There the memory access request may be sent to a further portion of the memory hierarchy for handling. Note that the compute and power expense of performing a lookup operation in the cache memory in these situations where an address of a memory access request is filtered from cache storage can be avoided. Understand while shown at this high level in the embodiment of FIG. 19, many variations and alternatives are possible.

A platform including a processor in accordance with an embodiment may include multiple distinct types of memory, including high bandwidth memory (referred to herein also as multi-channel memory (MCDRAM)), memory-side cache memory, or in-package memory) and bulk or off-package memory, referred to herein as a main or platform memory, which in an embodiment may be implemented with double data rate (DDR) DRAM. By providing a cache filter instruction as described herein, a programmer need not expose both MCDRAM and DDR to software as a flat memory, reducing complexity and configuration of this memory arrangement.

Figure 20:
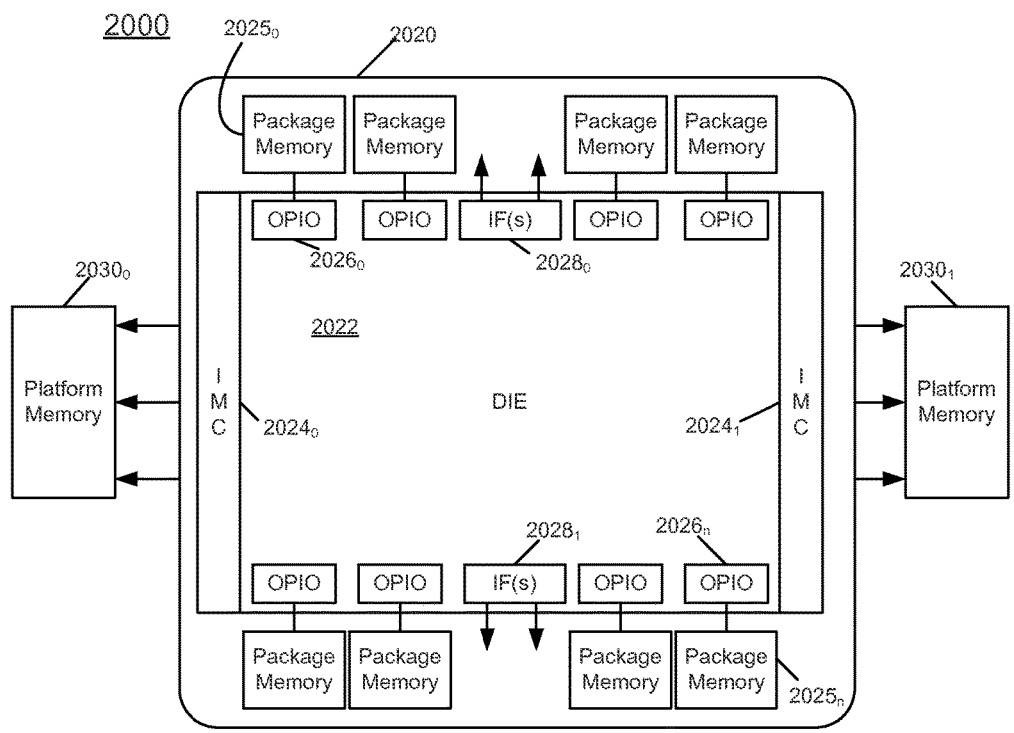
FIG. 20 is a block diagram of a portion of a system in accordance with an embodiment of the present invention.

Referring now to FIG. 20, shown is a block diagram of a portion of a system in accordance with an embodiment of the present invention. As shown in FIG. 20, system 2000 may be part of a given computing device ranging from a portable computing device such as smartphone, tablet computer, laptop computer or so forth to a personal computer, server computer or so forth. In the portion of the system shown in FIG. 20, a system on chip (SoC) or other processor 2020 is coupled to a platform memory $2030_1$-$2030_2$, which in an embodiment may be formed of DRAM, e.g., DDR DRAM. In the embodiment of FIG. 20, SoC 2020 may be implemented within a single package and can include a semiconductor die 2022 including a plurality of cores and other processing logic, along with internal package memory $2025_0$-$2025_n$. In an embodiment, in-package memory 2025 may be implemented as one or more separate die formed of, e.g., DRAM. While 8 such in-package memories are shown, more or fewer may be present in a given implementation. This in-package memory is also referred to herein as a memory-side cache or multi-channel DRAM (MCDRAM), while in turn platform memory 2030 may also be referred to herein as DDR DRAM. In one embodiment, in-package memory 2025 may provide much higher bandwidth compared to platform memory 2030 (e.g., 500 GB/s vs. 100 GB/s). In addition, this in-package memory may have a relatively large capacity in absolute terms (e.g., 16 GB).

Still with reference to FIG. 20, die 2022 further includes different types of memory controller circuitry, including integrated memory controllers (IMCs) $2024_0$ and $2024_1$, configured to interface with corresponding portions of platform memory 2030. In addition, on package input/output (OPIO) circuitry $2026_0$-$2026_n$ may include or be associated with additional memory controller circuitry, also referred to herein as embedded DRAM controllers (EDC), to interface with in-package memory 2025. In an embodiment a directory-based cache coherency protocol may be implemented in part via a distributed directory system including a caching home agent (CHA) of the memory controllers, which may include a system address decoder and home agent (HA) that are configured to provide the ability to access two different types of memory in the same address space. As such, the processor may further include two different types of home agents to facilitate sending requests to the different memory types. Each caching home agent owns a set of memory addresses. In an embodiment, a hash function is used to determine which address is owned by which caching home agent. All accesses to a memory address go to the caching home agent that owns that address, where it is serialized as appropriate versus other accesses to the same address, e.g., for cache coherency and memory consistency purposes. The system address decoder associated with the caching home agent checks the addresses of memory accesses coming to the caching home agent and determines which addresses reside in MCDRAM and which in DDR. Accordingly, it directs the memory access to MCDRAM or DDR. In addition, such circuitry may be configured to perform the address-based cache filtering described herein, to reduce cache pollution, improve latency, and reduce coherency communications for non-cached locations. Understand that in other embodiments, a directory structure may be implemented in other manners.

As further illustrated, die 2022 also includes multiple interfaces $2028_0$-$2028_1$ to interface with off-chip circuitry. As examples, interfaces 2028 may include one or more Peripheral Component Interconnect Express (PCIe) interfaces and one or more direct media interfaces (DMI), although other types of interface circuitry are possible.

Figure 21:
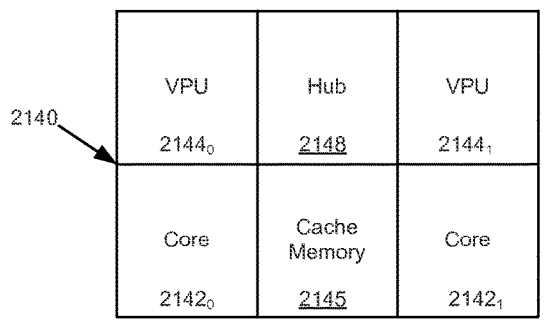
FIG. 21 is a representative tile in accordance with an embodiment.

As described above, die 2022 includes a plurality of cores and other logic circuitry. More specifically, in an embodiment these cores may be arranged as tiles including various processing circuitry, cache memory, interface circuitry and so forth. Illustrated in FIG. 21 is a representative tile in accordance with an embodiment. In the embodiment of FIG. 21, tile 2140 is shown to include a plurality of cores $2142_0$-$2142_1$, and a plurality of vector processing units $2144_0$-$2144_1$. In addition, tile 2140 further includes a cache memory 2145 and a hub 2148, which acts as an interface between circuitry within tile 2140 and other circuitry of the processor. In an embodiment, cores 2142 may be out-of-order execution cores adapted to perform multi-threaded processing and implement a given instruction set architecture. In other embodiments, asymmetric cores, including both out-of-order and in-order execution cores may be present. Understand that each core and vector processing unit may include internal cache memory and that cache memory 2145 may be a level 2 cache memory shared between the various processing circuits within a given tile. In an embodiment, hub 2148 may interface with an interconnect structure of the processor, which may be a ring-based interconnect, in one example.

Figure 22:
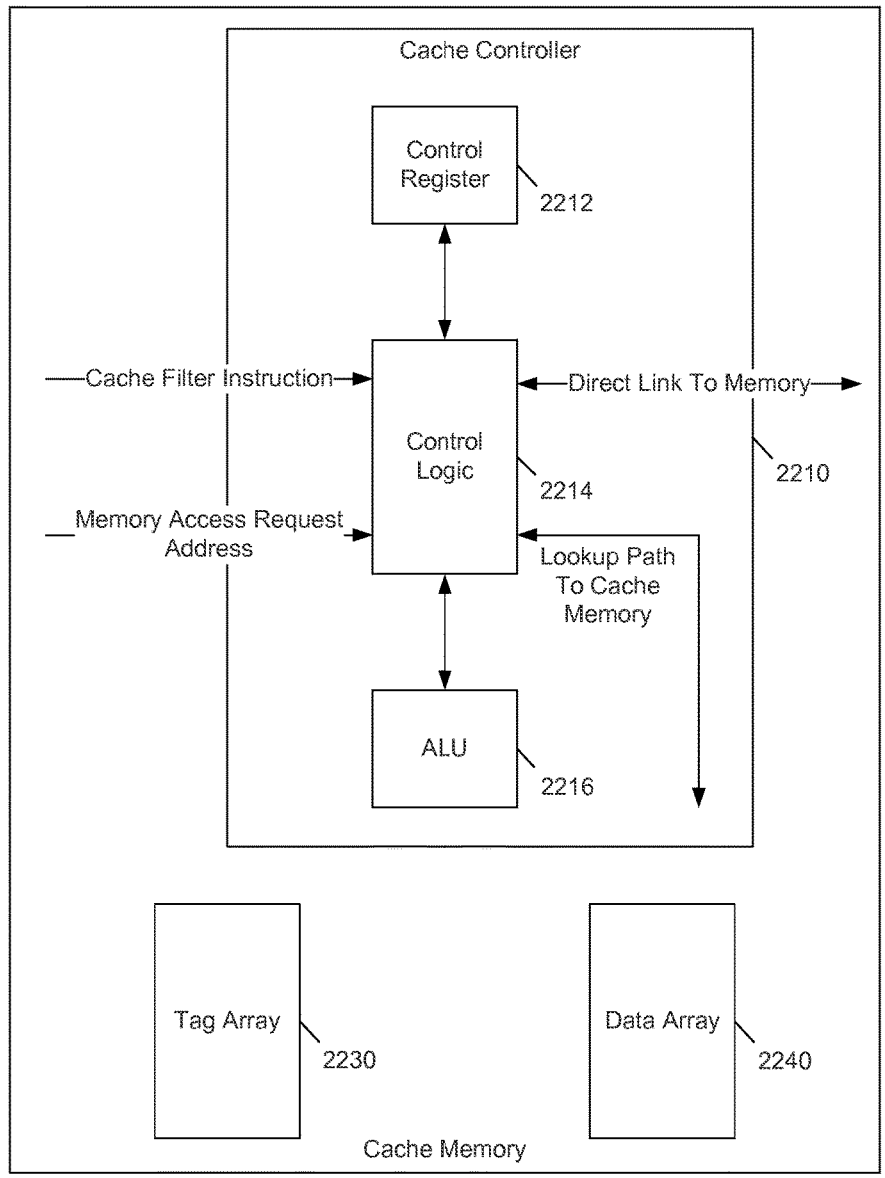
FIG. 22 is a block diagram of a cache memory in accordance with an embodiment of the present invention.

Referring now to FIG. 22, shown is a block diagram of a cache memory in accordance with an embodiment of the present invention. In the illustrated example, assume that cache memory 2200 is a memory-side cache implemented as a multi-channel DRAM (MCDRAM). Of course in other examples, cache memory 2200 may be a SRAM of an internal cache memory of a core, a shared cache memory on a processor die or so forth.

Data is stored in a data array 2240. In various embodiments, data array 2240 may be arranged into multiple banks or other portions, each of which can include a plurality of cache lines each to store various information, including metadata and corresponding data. To access a given cache line within data array 2240, a portion of a memory address of an incoming memory address request may be provided to a tag array 2230 to determine whether a hit occurs for a lookup operation. If so, the corresponding data may be read from the given cache line of data array 2240 or incoming data may be written thereto.

As further illustrated, cache memory 2200 includes a cache controller 2210. In addition to handling various cache management issues, including control of read, write, lookup, eviction and other operations, cache controller 2210 may further be configured to receive one or more cache filter instructions as described herein and perform appropriate cache configuration. And thereafter, cache controller 2210 may implement the cache filtering policy identified by the cache filter instruction such that only a portion of addresses of a memory address space are eligible for storage in cache memory 2200.

As illustrated, cache controller 2210 includes a control logic 2214. As seen, control logic 2214 is configured to receive a cache filter instruction. Responsive to such instruction, control logic 2214 may cause a filter mask associated with the instruction to be stored in a control register 2212. Thereafter, control logic 2214 may filter incoming memory address requests responsive to this cache filter instruction. More specifically, control logic 2214 may provide corresponding address bits of an address of a received memory access request to an arithmetic logic unit (ALU) 2216, along with the filter mask obtained from control register 2212. Depending upon a result of a logical operation between these values (e.g., an AND operation) control logic 2214 may direct the incoming memory request either via a lookup path to the cache memory itself or via a direct link to a next memory, which may be a more distant portion of a memory hierarchy. Understand while shown at this high level in the embodiment of FIG. 22, many variations and alternatives are possible.

Figure 23:
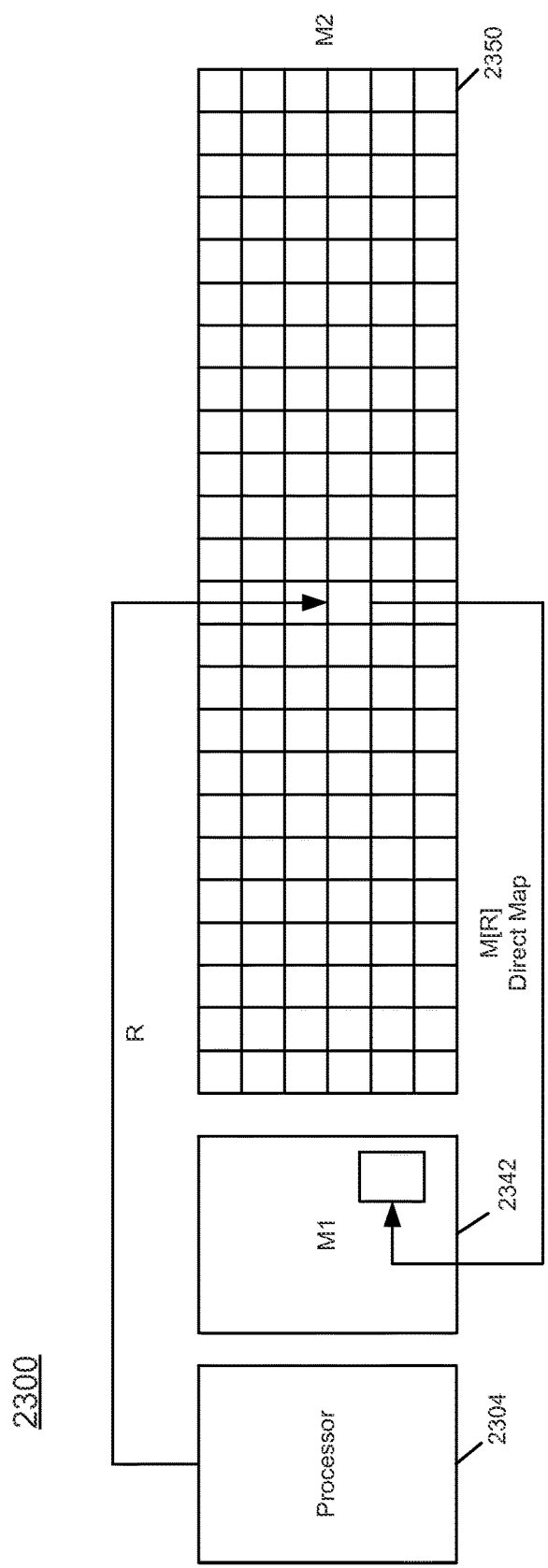
FIG. 23 is a block diagram of a system in accordance with an embodiment.

Referring now to FIG. 23, shown is a block diagram of a system in accordance with an embodiment. As shown in FIG. 23, system 2300 is illustrated at a high level as having a two-level memory (2LM) hierarchy in which a processor 2304 (e.g., a multicore processor or other SoC) is coupled to a first memory tier 2342, and a second, more capacious but slower system memory tier, 2350. In various embodiments the capacious memory 2350 may be a byte-addressable and directly addressable large capacity (e.g., multiple terabytes) memory tier created out of denser storage class memory technologies using phase change materials, memristors, or alternative memory technologies. In different embodiments persistent storage media may include (but is not limited to) one or more NVDIMM solutions that materialize persistent memory, such as NVDIMM-F, NVDIMM-N, resistive random access memory, Intel® 3DXPoint™-based memory, and/or other solutions. In a two-level mode of operation, the multiple terabytes of memory 2350 can be hardware-cached by system memory 2342 (e.g., DRAM) that is roughly an order of magnitude smaller in comparison, transparent to software. Such transparent caching enables applications to realize the higher capacity of this memory, but shields them from longer and non-uniform memory latencies presented by the capacious memory 2350. For brevity, "M2" is used herein to refer to the capacious memory 1850, and "M1" is used to refer to buffering memory 2342, which may be invisible or transparent to software but is used by hardware as a cache for M2. In various embodiments, cache filter instructions as described herein can be applied to various levels of the memory hierarchy shown in FIG. 23. In addition to processor-internal caches and a memory-side cache (if present) embodiments may further apply cache filter instructions to first memory tier 2342.

The following examples pertain to further embodiments.

In one example, a processor comprises: a fetch logic to fetch instructions; a decode logic to decode the instructions; a cache memory; and a control logic to receive a cache filter instruction and responsive to the cache filter instruction enable only a selected portion of a memory address space to be eligible to be cached in the cache memory, the cache filter instruction to indicate the selected portion of the memory address space.

In an example, the processor further comprises a control register to store a filter mask, the filter mask based at least in part on a data portion of the cache filter instruction.

In an example, the processor further comprises an arithmetic logic unit to receive a portion of a memory address of a memory access request and perform a logical operation between the portion of the memory address and the filter mask.

In an example, the control logic is to perform a lookup operation in the cache memory when a result of the logical operation is a first value and prevent the lookup operation in the cache memory when the result of the logical operation is not the first value.

In an example, when the result of the logical operation is not the first value, the control logic is to forward the memory access request to another portion of a memory hierarchy without performance of the lookup operation in the cache memory.

In an example, the control logic is associated with a directory and is to: issue a coherence request to one or more cache memories of the processor when a result of the logical operation is not a first value; and otherwise send the memory access request to a memory controller coupled to a system memory, without issuance of the coherence request.

In an example, the control logic is to enable a least significant portion of a memory address of a memory access request to be a tag value and a second portion of the memory address of the memory access request corresponding to the filter mask to be at least part of an index value.

In an example, the cache filter instruction comprises: a first field to indicate a cache memory level to which the cache filter instruction is directed; and a second field to indicate a width of the filter mask.

In an example, the cache filter instruction comprises a privileged instruction to be executed prior to initiation of an application having a working set with a size greater than a size of the cache memory.

In an example, the cache memory comprises a memory adapted on a first die of a processor package comprising the processor, the processor package further comprising a second die including a plurality of cores and one or more other cache memories.

Note that the above processor can be implemented using various means.

In an example, the processor comprises a SoC incorporated in a user equipment touch-enabled device.

In another example, a system comprises a display and a memory, and includes the processor of one or more of the above examples.

In another example, a method comprises: receiving a memory access request in a cache controller associated with a cache memory; executing a logical operation between a portion of a memory address of the memory access request and a filter mask provided by a cache filter instruction; performing a lookup operation in the cache memory for the memory access request if a result of the logical operation meets a caching criteria; and if the result of the logical operation does not meet the caching criteria, sending the memory access request to a further portion of a memory hierarchy, without performing the lookup operation in the cache memory.

In an example, the method further comprises, if the result of the logical operation meets the caching criteria, sending the memory access request to a further portion of a memory hierarchy, if the memory access request does not hit in the cache memory.

In an example, the method further comprises: receiving the cache filter instruction in the cache controller, prior to receiving the memory access request; and storing a filter mask obtained from the cache filter instruction in a control register of the cache controller.

In an example, the method further comprises: determining if the cache filter instruction is directed to a cache level of the cache memory, based on a first field of the cache filter instruction; and determining a number of bits of the filter mask to store in the control register of the cache controller, based on a second field of the cache filter instruction.

In an example, the method further comprises selecting at least a portion of bits of the memory address of the memory access request corresponding to the filter mask to be used for a cache tag.

In an example, the method further comprises maintaining a portion of a working set in the cache memory for a duration of execution of an application responsive to execution of the cache filter instruction.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system includes a processor comprising: a first die including a first core and a second core; and a second die including at least a portion of an in-package memory. The in-package memory may comprise a first cache memory and a cache controller, responsive to a cache filter instruction, to enable only a selected portion of a memory address space to be cached in the first cache memory, the cache filter instruction including a filter mask to indicate the selected portion of the memory address space, and determine whether a memory address request is eligible for storage in the first cache memory based at least in part on a portion of an address of the memory address request. The system may further include a platform memory coupled to the processor.

In an example, the system further comprises an arithmetic logic unit to receive the portion of the memory address of the memory access request and perform a logical operation between the portion of the memory address and the filter mask.

In an example, the cache controller is to perform a lookup operation in the first cache memory when a result of the logical operation is a first value, and prevent the lookup operation in the first cache memory and forward the memory access request to another portion of a memory hierarchy when the result of the logical operation is not the first value.

In an example, the cache controller is to receive the cache filter instruction from a privileged resource prior to initiation of an unprivileged application having a working set size greater than a size of the first cache memory.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   a fetch logic to fetch instructions;
   a decode logic to decode the instructions;
   a cache memory;
   a control logic to receive a cache filter instruction of an instruction set architecture and responsive to the cache filter instruction to configure the cache memory to enable only a selected portion of a memory address space of a memory hierarchy formed of one or more memories external to the processor to be eligible for cache allocation to be cached in the cache memory, the cache filter instruction having a data portion comprising a filter mask to indicate one or more bits of a memory address of a memory access request that are to have a predetermined value for data of the memory access request to be eligible for the cache allocation; and
   a control register to store the filter mask, wherein the cache filter instruction comprises:
      a first field to indicate a cache memory level to which the cache filter instruction is directed; and
      a second field to indicate a width of the filter mask.

2. The processor of claim 1, further comprising an arithmetic logic unit to receive a portion of a memory address of a first memory access request to the memory hierarchy and perform a logical operation between the portion of the memory address and the filter mask.

3. The processor of claim 2, wherein the control logic is to perform a lookup operation in the cache memory when a result of the logical operation is a first value and prevent the lookup operation in the cache memory when the result of the logical operation is not the first value.

4. The processor of claim 3, wherein when the result of the logical operation is not the first value, the control logic is to forward the first memory access request to the memory hierarchy without performance of the lookup operation in the cache memory.

5. The processor of claim 1, wherein the control logic is to enable a least significant portion of a memory address of a first memory access request to be a tag value and a second portion of the memory address of the first memory access request corresponding to the filter mask to be at least part of an index value.

6. The processor of claim 1, wherein the cache filter instruction comprises a privileged instruction of a supervisor agent to be executed prior to initiation of an unprivileged application having a working set with a size greater than a size of the cache memory.

7. The processor of claim 1, wherein when the one or more bits of the memory address of the memory access request do not have the predetermined value, the data of the memory access request is not eligible for the cache allocation.

8. A non-transitory machine-readable medium having stored thereon data, which if used by at least one machine, causes the at least one machine to fabricate at least one integrated circuit to perform a method comprising:
   receiving a cache filter instruction in a cache controller associated with a cache memory, the cache filter instruction including a filter mask to indicate one or more bits of a memory address of a memory access request that are to have a predetermined value for data of the memory access request to be eligible to be cached in the cache memory;
   storing at least a portion of the filter mask provided by the cache filter instruction in a control register of the cache controller;
   thereafter receiving a first memory access request in the cache controller;
   executing a logical operation between a portion of a memory address of the first memory access request and the filter mask, wherein the cache filter instruction is of an instruction set architecture and to indicate a portion of an address space of a memory hierarchy eligible to be cached in the cache memory, wherein a remainder of the address space is not eligible to be cached in the cache memory;
   performing a lookup operation in the cache memory for the first memory access request if a result of the logical operation meets a caching criteria; and
   if the result of the logical operation does not meet the caching criteria, sending the first memory access request to a further portion of the memory hierarchy, without performing the lookup operation in the cache memory.

9. The non-transitory machine-readable medium of claim 8, wherein the method further comprises, if the result of the logical operation meets the caching criteria, sending the memory access request to the further portion of the memory hierarchy, if the first memory access request does not hit in the cache memory.

10. The non-transitory machine-readable medium of claim 9, wherein the method further comprises:
    determining if the cache filter instruction is directed to a cache level of the cache memory, based on a first field of the cache filter instruction; and
    determining a number of bits of the filter mask to store in the control register of the cache controller, based on a second field of the cache filter instruction.

11. The non-transitory machine-readable medium of claim 9, wherein the method further comprises selecting at least a portion of bits of the memory address of the first memory access request corresponding to the filter mask to be used for a cache tag.

12. The non-transitory machine-readable medium of claim 8, wherein the method further comprises maintaining a portion of a working set in the cache memory for a duration of execution of an application responsive to execution of the cache filter instruction.

13. A system comprising:
    a processor comprising:
        a first die including a first core and a second core; and
        a second die including at least a portion of an in-package memory, the in-package memory comprising a first cache memory and a cache controller, responsive to a cache filter instruction, to configure the first cache memory to enable only a selected portion of a memory address space of a platform memory external to the processor to be cached in the first cache memory, the cache filter instruction including a filter mask to indicate one or more bits of a memory address of a memory access request that are to have a predetermined value for data of the memory access request to be enabled to be cached in the first cache memory, and determine whether the memory access request is eligible for storage in the first cache memory based at least in part on the one or more bits of the memory address of the memory access request; and
    the platform memory coupled to the processor.

14. The system of claim 13, further comprising an arithmetic logic unit to receive the portion of the memory address of the memory access request and perform a logical operation between the one or more bits of the memory address and the filter mask.

15. The system of claim 14, wherein the cache controller is to perform a lookup operation in the first cache memory when a result of the logical operation is a first value, and prevent the lookup operation in the first cache memory and forward the memory access request to the platform memory when the result of the logical operation is not the first value.

16. The system of claim 13, wherein the cache controller is to receive the cache filter instruction from a privileged resource prior to initiation of an unprivileged application having a working set size greater than a size of the first cache memory.

17. The system of claim 13, wherein when the one or more bits of the memory address of the memory access request do not have the predetermined value, the data of the memory access request is not enabled to be cached in the first cache memory.

* * * * *